(12) United States Patent
LeMay et al.

(10) Patent No.: US 10,706,164 B2
(45) Date of Patent: Jul. 7, 2020

(54) CRYPTO-ENFORCED CAPABILITIES FOR ISOLATION

(71) Applicant: Intel Corporation, Santa Clara, CA (US)

(72) Inventors: Michael LeMay, Hillsboro, OR (US); David D. Durham, Beaverton, OR (US); Mingwei Zhang, Hillsbor, OR (US); Vedvyas Shanbhogue, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 15/721,082

(22) Filed: Sep. 29, 2017

(65) Prior Publication Data

US 2019/0102567 A1 Apr. 4, 2019

(51) Int. Cl.
| | |
|---|---|
| *G06F 21/00* | (2013.01) |
| *G06F 21/62* | (2013.01) |
| *G06F 8/41* | (2018.01) |
| *G06F 21/44* | (2013.01) |
| *G06F 21/53* | (2013.01) |
| *G06F 21/78* | (2013.01) |
| *G06F 9/455* | (2018.01) |

(52) U.S. Cl.
CPC ............... *G06F 21/62* (2013.01); *G06F 8/41* (2013.01); *G06F 21/44* (2013.01); *G06F 21/53* (2013.01); *G06F 21/78* (2013.01); *G06F 2009/45587* (2013.01); *G06F 2221/2107* (2013.01)

(58) Field of Classification Search
None
See application file for complete search history.

(56) References Cited

U.S. PATENT DOCUMENTS

| | | | | |
|---|---|---|---|---|
| 5,724,425 | A * | 3/1998 | Chang ................... | G06F 21/125 380/30 |
| 5,933,497 | A * | 8/1999 | Beetcher ............... | G06F 21/121 705/59 |
| 7,752,459 | B2 * | 7/2010 | Cowan ................ | G06F 12/1408 713/190 |

(Continued)

OTHER PUBLICATIONS

S. J. Mullender et al., "Amoeba: A Distributed Operating System for the 1990s," Computer, vol. 23, No. 5, pp. 44-53, May 1990.

(Continued)

*Primary Examiner* — Maung T Lwin
(74) *Attorney, Agent, or Firm* — Schwabe, Williamson & Wyatt, P.C.

(57) ABSTRACT

Apparatuses for computing are disclosed herein. In embodiments, an apparatus may include one or more processors, a memory, and a compiler to be operated by the one or more processors to compile a computer program. The compiler may include one or more analyzers to parse and analyze source code of the computer program that generates pointers or de-references pointers. The compiler may also include a code generator coupled to the one or more analyzers to generate executable instructions for the source code of the computer program including insertion of additional encryption or decryption executable instructions into the computer program, based at least in part on a result of the analysis, to authenticate memory access operations of the source code.

23 Claims, 14 Drawing Sheets

(56) References Cited

U.S. PATENT DOCUMENTS

| | | | | |
|---|---|---|---|---|
| 7,865,961 | B2* | 1/2011 | Hasegawa | G06F 21/125 |
| | | | | 326/8 |
| 7,873,954 | B2* | 1/2011 | Ullmann | G06F 9/4484 |
| | | | | 717/160 |
| 8,892,893 | B2* | 11/2014 | Horne | G06F 21/16 |
| | | | | 713/176 |
| 2003/0200467 | A1* | 10/2003 | Choy | G06F 21/6218 |
| | | | | 726/4 |
| 2008/0271001 | A1* | 10/2008 | Nonomura | G06F 21/125 |
| | | | | 717/143 |
| 2010/0257576 | A1* | 10/2010 | Valente | H04L 41/0266 |
| | | | | 726/1 |
| 2016/0092702 | A1* | 3/2016 | Durham | G06F 21/556 |
| | | | | 713/190 |
| 2017/0140148 | A1* | 5/2017 | Gleeson | G06F 21/125 |

OTHER PUBLICATIONS

M. Rozier et al., "Overview of the CHORUS Distributed Operating Systems," Chorus Systèmes CS/TR-90-25.1, Feb. 1991 (revised and updated version of article as printed in Computing Systems, vol. 1, pp. 39-69, 1991).

Reto Achermann et al., "Separating Translation from Protection in Address Spaces with Dynamic Remapping." HotOS 2017.

* cited by examiner

Example 1:

| Permanent? | log2(obj. size) | Pointer |
|---|---|---|
| 0 or 1 | 0 | 0x0027 |

930

Example 2:

| Permanent? | log2(obj. size) | Pointer |
|---|---|---|
| 0 or 1 | 4 | 0x0040 |

935

Example 3:

| Permanent? | log2(obj. size) | Pointer |
|---|---|---|
| 0 or 1 | 4 | 0x0047 |

940

Example 4:

| Permanent? | log2(obj. size) | Pointer |
|---|---|---|
| 0 or 1 | 4 | 0x0053 |

945

Example 5:

| Permanent? | log2(obj. size) | Pointer |
|---|---|---|
| 0 or 1 | 4 | 0x0053 |

950

Example 6:

| Permanent? | log2(obj. size) | Pointer |
|---|---|---|
| 0 | 5 | 0x1000 |

955

Example 7:

| Permanent? | log2(obj. size) | Pointer |
|---|---|---|
| 0 | 5 | 0x1000 |

960

(Pointer 955 encrypted with new encryption key)

Example 7.5:

| Permanent? | log2(obj. size) | Pointer |
|---|---|---|
| 0 | 2 | 0x1000 |

961

(Pointer 955 with shrunken Object size)

Example 7.6:

| Permanent? | log2(obj. size) | Pointer |
|---|---|---|
| 0 | 2 | 0x1000 |

Example 8:

| | Permanent? | log2(obj. size) | Pointer |
|---|---|---|---|
| 955 | 0 | 5 | 0x1000 |

Example 10:

| | Permanent? | log2(obj. size) | Pointer | |
|---|---|---|---|---|
| 970 | 0 | 2 | 0x1020 | P.0 |

| | Permanent? | log2(obj. size) | Pointer | |
|---|---|---|---|---|
| 975 | 0 | 2 | 0x1000 | Corrupted P.0 |

CRYPTO-ENFORCED CAPABILITIES FOR ISOLATION

TECHNICAL FIELD

Embodiments of the present disclosure relate to the field of computing, and in particular to apparatuses, methods and storage media associated with encrypting and decrypting pointers (including associated metadata) used to direct and restrict memory accesses of computer programs.

BACKGROUND

When a software application runs on a computing device, a processor executes machine-level instructions into which high level source code of the application has been translated (e.g., by a compiler). The pre-defined set of machine-level instructions that a particular processor can execute is the processor's instruction set. The processor typically fetches the machine-level instructions corresponding to the functionality of a software application from memory and then executes the instructions.

During execution of a software application, the operating system may allocate memory to an executing process using a memory allocation mechanism. Memory allocation mechanisms allocate an amount of memory (e.g., a block of memory locations, where the size of the block of memory locations is specified as an argument), and return a pointer that points to the beginning of the allocated memory (e.g., the pointer points to the beginning of the allocated block of memory locations). In some contexts, multiple processes may be executing at the same time on a processor of a computing device, and each process may have access to a shared region of memory of the processor. Malicious code may be inserted into high level source code and machine, and potentially other program representations code by an adversary or an attack on the computing device. The malicious code may seek to access a region of memory (either specific to a single process or shared by multiple processes) that the original source code of that process did not seek to access, or did not have access to. Alternatively, the original source code may have been authored in part or in whole by an adversary seeking to compromise the security of other services running on the same platform that runs the malicious code by seeking to perform unauthorized memory accesses.

BRIEF DESCRIPTION OF THE DRAWINGS

Embodiments will be readily understood by the following detailed description in conjunction with the accompanying drawings. To facilitate this description, reference numerals designate like structural elements. Embodiments are illustrated by way of example, and not by way of limitation, in the figures of the accompanying drawings.

FIG. 9A illustrates example pointers generated by functions running in the example protection domains of FIG. 8, in accordance with various embodiments.

FIG. 9B illustrates additional example pointers generated by functions running in the example protection domains of FIG. 8, in accordance with various embodiments.

DETAILED DESCRIPTION

Figure 1A:
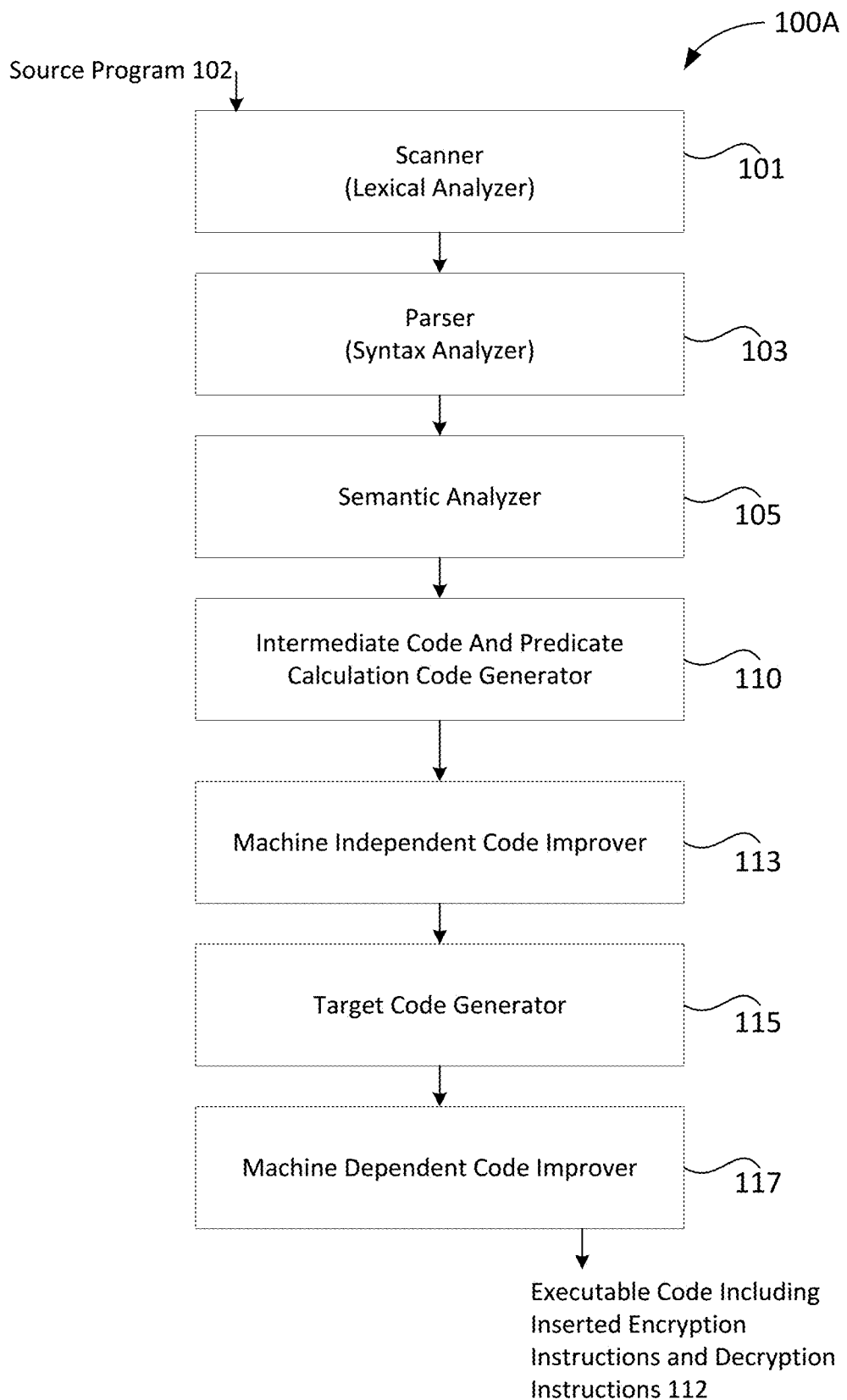
FIG. 1A illustrates an example compiler architecture to compile source code and output executable code including inserted encryption and decryption instructions, in accordance with various embodiments.

In embodiments, an apparatus for computing may include one or more processors, a memory, and a compiler to be operated by the one or more processors to compile a computer program. The compiler may include one or more analyzers to parse and analyze source code of a computer program that generates pointers or de-references pointers, a code generator coupled to the one or more analyzers to generate executable instructions for the source code of the computer program including insertion of additional encryption or decryption executable instructions into the computer program, based at least in part on a result of the analysis, to authenticate memory access operations of the source code.

In embodiments, rather than all code in a process being granted full access to all memory within that process' address space, different services loaded into the same process may only be granted access to memory regions on an as-needed basis.

Further, in embodiments, a method of authenticating access to a memory region shared by one or more applications running on a computing device may include receiving a first request from a function running in a protection domain (PD) of a runtime environment to allocate an object in a shared memory and to generate a capability to access it, and assigning a key to the PD and generating an encrypted pointer to the memory location of the object using an identifier of the PD (PDID) and the key. The method may further include receiving a second request from a function running in the PD to use the capability, and decrypting the capability and passing an unencrypted pointer to the object to the function.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group, including one or more "processing elements (PEs) of a data flow machine), and/or memory (shared, dedicated, or group) that execute one or more software or firmware programs, a programmable combinational logic circuit (e.g. Field Programmable Gate Arrays (FPGA)), and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "protection domain" (PD) refers to a set of access privileges to protected resources. Where many processes coexist, each process having differing access permission to a number of protected resources via some form of a key, it may be convenient to group together a set of such keys in order to provide a single process with access to the resources that it requires. Access control can then be manipulated independent of the processes concerned. The protection domain may be either the set of keys, or equivalently, the set of resources to which the keys give access. Several protection domains may operate on a server or other computing device, and they may each have access to a shared memory. Where multiple microservices (see below) operate on a single device, each microservice may operate in a separate protection domain. A computing device may assign each of one or more protection domains access to a private region of memory for its code stack and private heap, and may also grant each protection domain access to a shared memory region, subject to conditions, or for a defined time interval.

As used hereinafter, including the claims, the term "microservice" refers to an approach to application development in which a single application is developed as a suite of small services, each service running in its own process and communicating with lightweight mechanisms, often an HTTP resource API. The services are built around business capabilities and may be independently deployable.

It is noted that in a software application, the program source is transformed into a list of machine executable instructions for a particular processor, which is then loaded into a memory attached to the processor. Data and instructions are read from memory into the processor core, where the instructions are executed and the results then written back to memory. In embodiments, a compiler for compiling a computer program, may be used to parse and analyze source instructions of a computer program including identification of source code that generates pointers or de-references pointers, and may be further used to generate and output executable code for the computer program including insertion of additional encryption or decryption executable instructions into the computer program, based at least in part on a result of the analysis, to authenticate and authorize memory access operations of the source code.

It is here noted that a compiler is a program that reads a source code (in a source language) and translates it into a target code (in a machine language). The compiler, while formulating the target code, forms an intermediate code (in a machine-independent form). For example, a compiler for C translates a high-level source code in the C programming language into a target code in machine language, which can be executed by a computer processor, e.g., X86 instructions executable on an Intel® processor or machine instructions executable on an ARM® processor. In addition, the compiler for C, while forming the target code, forms an intermediate code. Machine-independent and machine-dependent optimizations may be performed on the intermediate code.

It is further noted that complex datacenter workloads are increasingly structured as microservices, in that the overall functionality of the workload is divided into numerous loosely-coupled services that are often isolated in different containers and that communicate via message passing. This proliferation of processes and remote procedure calls (RPCs) may introduce substantial overhead from a number of sources. In embodiments, new instructions may be generated to shrink that overhead by combining multiple services into a single address space so that pointers to message data can be shared directly. However, even though the services may share an address space, such new instructions may keep the various microservices isolated by encrypting capabilities (tokens) that must be possessed by each service to access shared resources such as message content in memory.

Figure 1B:
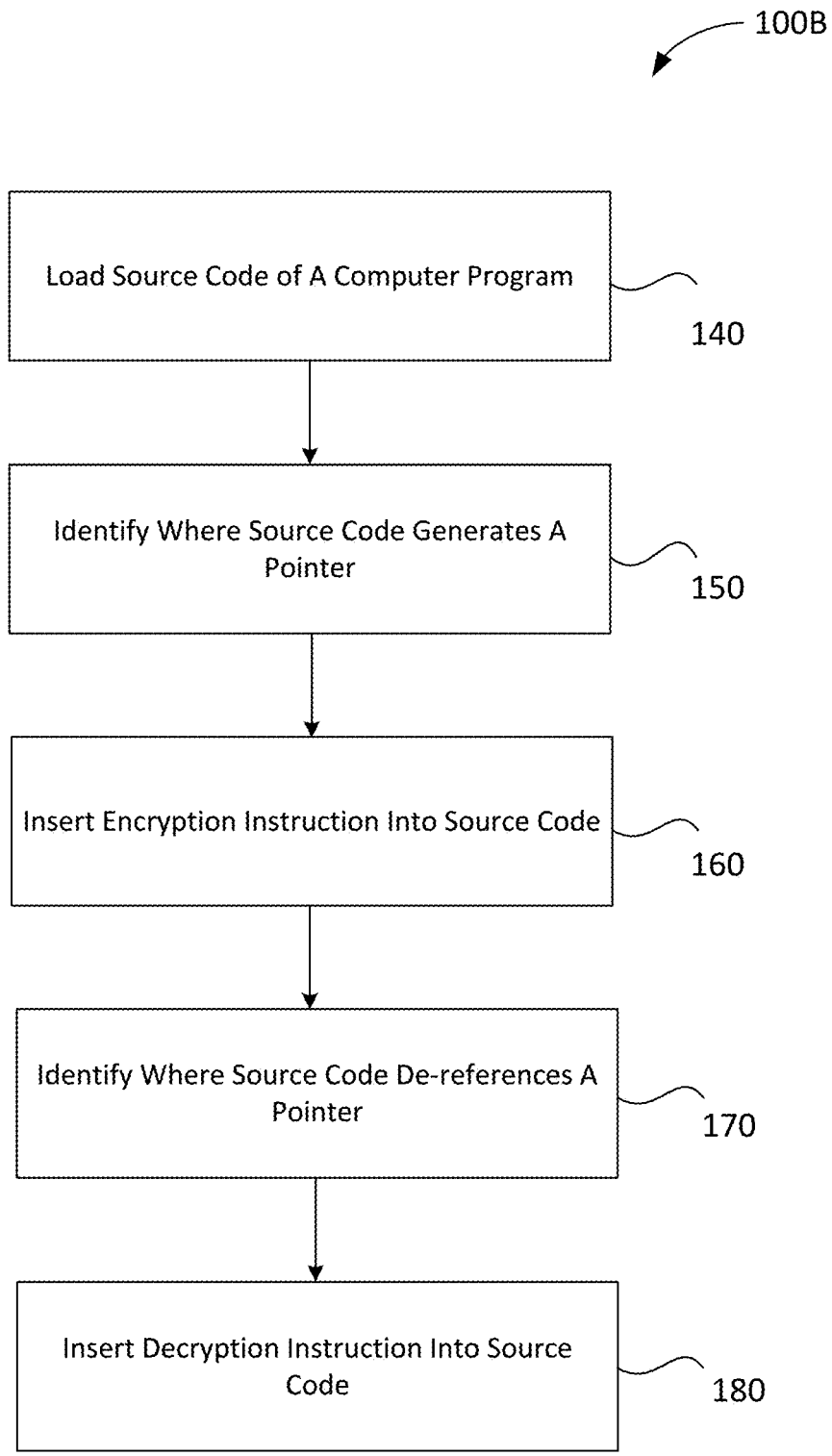
FIG. 1B illustrates an overview of the operational flow of a process for loading source code of a computer program, identifying where the source code generates a pointer or de-references a pointer, and generating executable code including encryption and decryption instructions, in accordance with various embodiments.

As noted, in embodiments, a compiler may instrument original source code to insert new instructions. The new instructions may include encryption instructions to follow any source code instruction that generates a pointer, and may also include a decryption instruction that it inserted where the source code de-references a pointer. FIGS. 1A and 1B illustrate this compiler instrumentation process according to various embodiments.

With reference to FIG. 1A, beginning with compiler block 101, there may be a Scanner, or Lexical Analyzer, which may convert a source program's 102 stream of characters into a stream of tokens, and remove whitespace, remove comments, expand macros and so forth. The resulting token stream may be passed to a Parser, or Syntax Analyzer 103, that may turn the token sequence into e.g., an abstract syntax tree. The abstract syntax tree generated by Parser 103 may be passed to Semantic Analyzer 105, which may check legality rules, and, while doing so, may also tie up the pieces of the syntax tree (by resolving identifier references, inserting cast operations for implicit coercions, etc.) to form a semantic graph. In embodiments, Semantic Analyzer 105 may identify nested loops and data dependencies of Source Program 102, and include the information in the semantic graph.

Continuing with reference to FIG. 1A, the semantic graph generated by Semantic Analyzer 105 may be passed to Intermediate Code And Predicate Calculation Code Generator 110. Intermediate Code And Predicate Calculation Code Generator 110 may generate intermediate code (pre-optimization) for Source Program 102 in accordance with the semantic graph. In embodiments, Intermediate Code And Predicate Calculation Code Generator 110 may also produce code for encrypting pointers following pointer generation and code for decrypting pointers when pointers are de-referenced. The intermediate code (including the code for encrypting pointers and decrypting pointers) may be passed to Machine Independent Code Improver 113. Machine Independent Code Improver 113 may optimize the intermediate code in various ways, and pass the optimized code to Target Code Generator 115.

Target Code Generator 115 may string basic blocks together into straight line code with fall-through, and pass assembly language code to a final stage, Machine Dependent Code Improver 117, which may perform additional optimizations and cleanup, and produce Executable Code 112. As shown at 112 in FIG. 1A, compiler 100A outputs executable code including encryption instructions and decryption instructions to authenticate pointer generation and pointer de-referencing in the source code. In some embodiments, these encryption and decryption instructions may be the "ENCCAP" (encrypt capability), "DECDCAP" (decrypt data capability) and "DECCCAP" (decrypt code capability) instructions, as described in detail below. Alternatively, they may be other instructions that have similar, or equivalent, functionalities. In embodiments, the encryption and decryption instructions may provide a mechanism for one part of a computer program to transmit an authorization to another part of the program to access a certain piece of memory.

Besides incorporating these teachings, compiler 100A may be any compiler known in the art, capable of compiling source code in a high level language, e.g. C, C++, Fortran, etc., and outputting machine executable code. While for ease of understanding compiler 100A has been described as having seven phases. In alternate embodiments, some of the phases may be combined or split. Similarly, in alternate embodiments, the identification of pointer generation and pointer dereferencing, and generation of the code to encrypt pointers and decrypt encrypted pointers may be implemented in other phases or supplemental functions of the compiler beside Semantic Analyzer 105 and/or Intermediate Code And Predicate Calculation Code Generator 110.

FIG. 1B illustrates an overview of operational flow for a process for a compiler, e.g., a compiler having an architecture as depicted in FIG. 1A, operating on source code and generating corresponding object code that includes executable code to encrypt generated pointers and decrypt de-referenced pointers, in accordance with various embodiments. As illustrated, processes 100B may include operations performed at blocks 140-170. With reference to FIG. 1B, process 100B may begin at block 140. At block 140 a compiler may load source instructions of a computer program for analysis, e.g., Source Program 102 of FIG. 1A. From block 140 process 100B may proceed to block 150, where the compiler may identify where the source code generates a pointer to a memory address or addresses. From block 150, process flow may proceed to block 160, where the compiler may generate and output executable computer code that, when executed, encrypts the pointer, and insert the identified instruction into the source code. From block 160 process 100B may proceed to block 170, where the compiler may identify where the source code de-references a pointer to a memory address or addresses. From block 170, process flow may proceed to block 180, where the compiler may generate and output executable computer code that, when executed, decrypts an encrypted pointer prior to de-referencing it in memory. From block 180, process flow may return to block 150, if there is more source code to analyze, and repeat the processing at blocks 150 through 180, or if there is no additional source code to analyze, process 100B may terminate.

Figure 2:
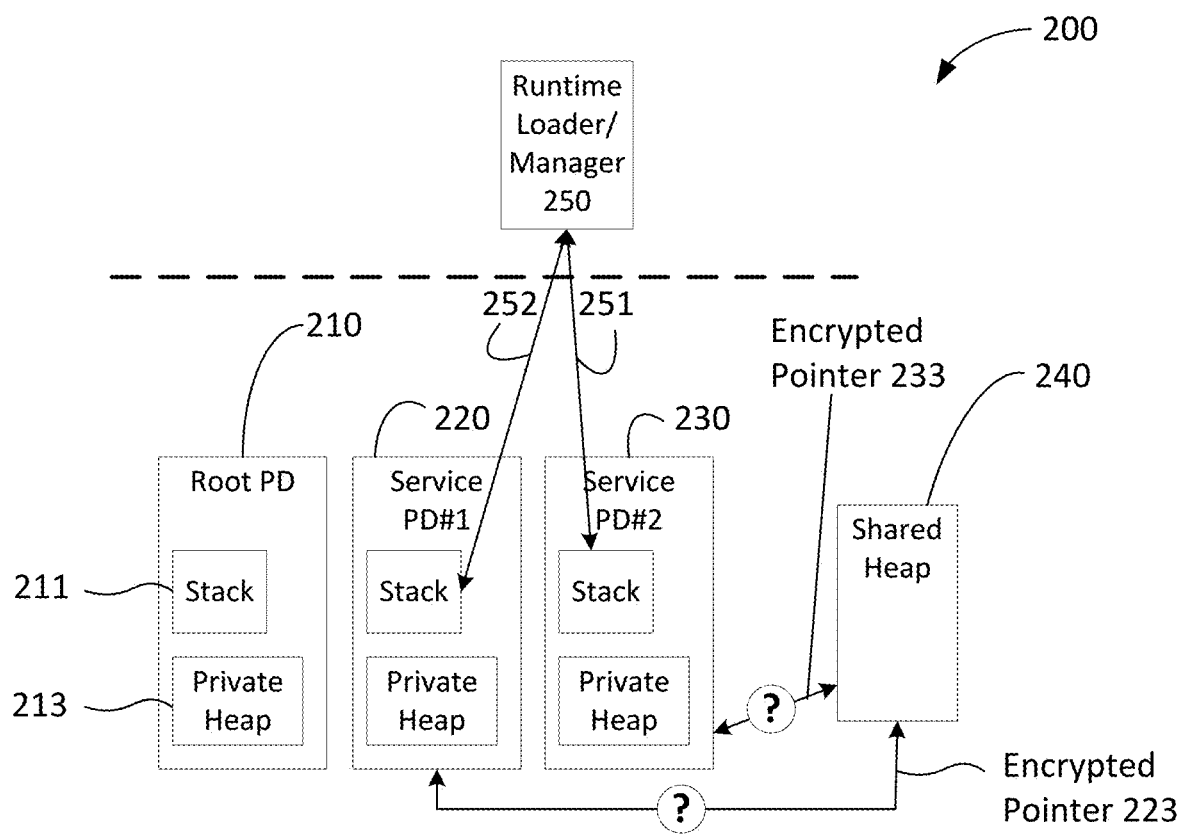
FIG. 2 illustrates an example memory layout for hosting multiple services in a runtime environment, according to various embodiments.

In embodiments, rather than all code in a given process being granted full access to all memory within that process' address space, different services loaded into the same process may be only granted access to memory regions on an as-needed basis. For example, one possible memory layout for hosting multiple microservices in a runtime environment hosted as a virtual machine is depicted in FIG. 2. With reference thereto, there is a root PD 210 with its own (code) stack 211 and private heap 213. Similarly, there is also a PD #1 220, associated with a first service, and a PD #2 230, associated with a second service operating in the runtime environment. Continuing with reference to FIG. 2, each of the services associated with PD #1 220 and PD #2 230 have, as does PD 210, a stack and private heap. In addition, each service may be granted capabilities by Root PD 210 to access necessary objects in shared heap 240, and each service can also generate capabilities (e.g., pointers) granting itself access to objects in its own stack and private heap. In embodiments, these capabilities may be encrypted by a key that is managed by Root PD 210 to prevent unauthorized capabilities from being generated by these services, such as, for example, one service attempting to access an object that is being processed by another service.

Continuing with reference to FIG. 2, there is a shared heap 240, which may be used by services 220 and 230 to access objects, operate on them, and store the modified object back into the shared memory on a conditional and limited basis. Namely, in embodiments, all services not associated with Root PD 210 may only access shared heap 240 if the pointer (when encrypted, and metadata added, also referred to herein as a "capability") they use to access shared heap 240 is successfully decrypted. Thus, a service running in PD #1 220 may generate an encrypted pointer or capability 223 to an object in shared heap 240, based on execution of an encryption instruction that is inserted into its executable code as described above. Access to the object may or may not be granted, depending upon whether the encrypted pointer 223 successfully decrypts via a decryption instruction inserted into its executable code, also as described above. The same conditional access applies to encrypted pointer 233, that may be generated by a service running in PD #2 230. Therefore, encrypted pointers 223 and 233 are indicated with a question mark in FIG. 2. If the encrypted pointer has been attacked, or illicitly manipulated, as described below, it will not successfully decrypt when the service using it tries to de-reference it using the encrypted pointer, and access to the object in shared heap 240 will be denied. In this manner, various services operating in the runtime environment may pass objects to one another in a controlled way, and thereby retain any hierarchical structure that the objects may include.

For the protections of encryption in accordance with various embodiments to be realized, the original source code needs to be properly instrumented, as described above in connection with FIGS. 1A and 1B. Towards this end, there may be a runtime loader 250 that, prior to execution of any code in the stack of a PD, may scan all code to ensure that encryption and decryption instructions were in fact inserted by the compiler, as shown in FIG. 1B. This scanning is illustrated in FIG. 2 by arrows 251, 252 provided between runtime loader/manager 250 and the respective stacks of PD #1 220 and PD #2 230. In embodiments, if the code fails this test, runtime loader/manager 250 may refuse to load it.

It is noted that conventionally individual microservices may be hosted in separate virtual machines (VMs) or containers. However, that may introduce substantial overhead due to context switching, page table maintenance, translation lookaside buffer (TLB) flushes, network stack overhead for message passing, etc. In contrast, capability-isolated services do not suffer from these overheads. While there may be some overhead stemming from the use of the capabilities, such as the cost of encrypting and decrypting them, that is significantly lower than the conventional separate VM model. It is also generally true that if separate VMs are used an object cannot be passed between services without collapsing the hierarchical structure of the object.

In embodiments, each microservice in a runtime environment of a processor may be assigned a Protection Domain ID (PDID). For example, a PDID may have 32 bits. In embodiments, the PDID may be used as an immediate value that is embedded in various immediate operands in the microservice code. Moreover, all microservices that are simultaneously loaded into a single instance of a runtime environment must have distinct PDIDs. It is noted that a 32-bit PDID space can minimize the chance of PDID collisions if PDIDs are randomly assigned, but collisions may still occur. Collisions may also occur if a single microservice is loaded multiple times. To handle PDID collisions, in embodiments, the microservice code can be copied so that the embedded PDIDs can be reassigned to a different PDID. Alternatively, additional information can be mixed into the PDID. For example, in x86-64 processors, bits 47:32 of a current instruction pointer (IP) may be automatically used to replace the upper or lower 16 bits of the embedded PDID. In embodiments, by allocating 4GiB of linear address space to each Protection Domain (PD) and selecting a 4GiB-aligned memory layout that avoids collisions between the final computed PDIDs, collisions may be avoided without requiring any duplication of code pages. It is also noted that 47:32 of a current RIP could be used on their own to specify the PDID without requiring immediate operands. Other alignment sizes could be used equivalently with the corresponding slice of address bits being used to determine all or part of the PDID: IP[most significant usable address bit index:log 2(PD alignment size)].

As noted above, in embodiments, a compiler is responsible for instrumenting source code with encryption and decryption instructions according to various embodiments. It is recalled that "instrumenting code" as used herein refers to modifying source code, an intermediate representation, or machine code, so that it contains the new instructions at the appropriate places. In embodiments, several new instructions that may be added to an instruction set are described. These instructions may, in embodiments, implement the encryption instruction and decryption instructions noted in connection with FIG. 1B, and thereby create the encrypted pointers of FIG. 2. For ease of illustration, they are fashioned to fit into an Intel® Corporation Instruction Set Architecture and are so described. However, it is noted that the functionality of these new instructions may be implemented in any instruction set, in accordance with various embodiments. These new instructions are referred to herein as "ENCCAP" (encrypt a capability), "DECDCAP" (decrypt a data capability) and "DECCCAP" (decrypt a code capability). In addition, a new instruction to narrow a capability, "NARROWCAP" (narrow the memory bounds of an existing capability) is also described below in connection with alternate embodiments, as well as a new instruction to generate a key for an incipient epoch "INCEPOCH." It is to be understood that wherever these particular instructions are described below, equivalent or similar instructions providing their functionality are to be included. Being executable instructions, ENCCAP, DECDCAP and DECCCAP, NARROWCAP and INCEPOCH, while the result of compiler instrumentation, each execute at runtime.

Thus, in embodiments, an ENCCAP instruction may be used when one part of the program wants to grant access to a piece of memory to some other part of the program. For example, if a heap allocator wants to grant access to a new heap allocation to a part of a program that requested the heap allocation. Or, for example, if a part of the program wants to grant access to an array of integers to a function that sorts arrays of integers. Similarly, a DECDCAP instruction may be used in the receiving parts of the program to convert the incoming tokens to standard pointers that can be used by memory access instructions. Thus, ENCCAP and DECDCAP encrypt and decrypt pointers.

Figure 3:
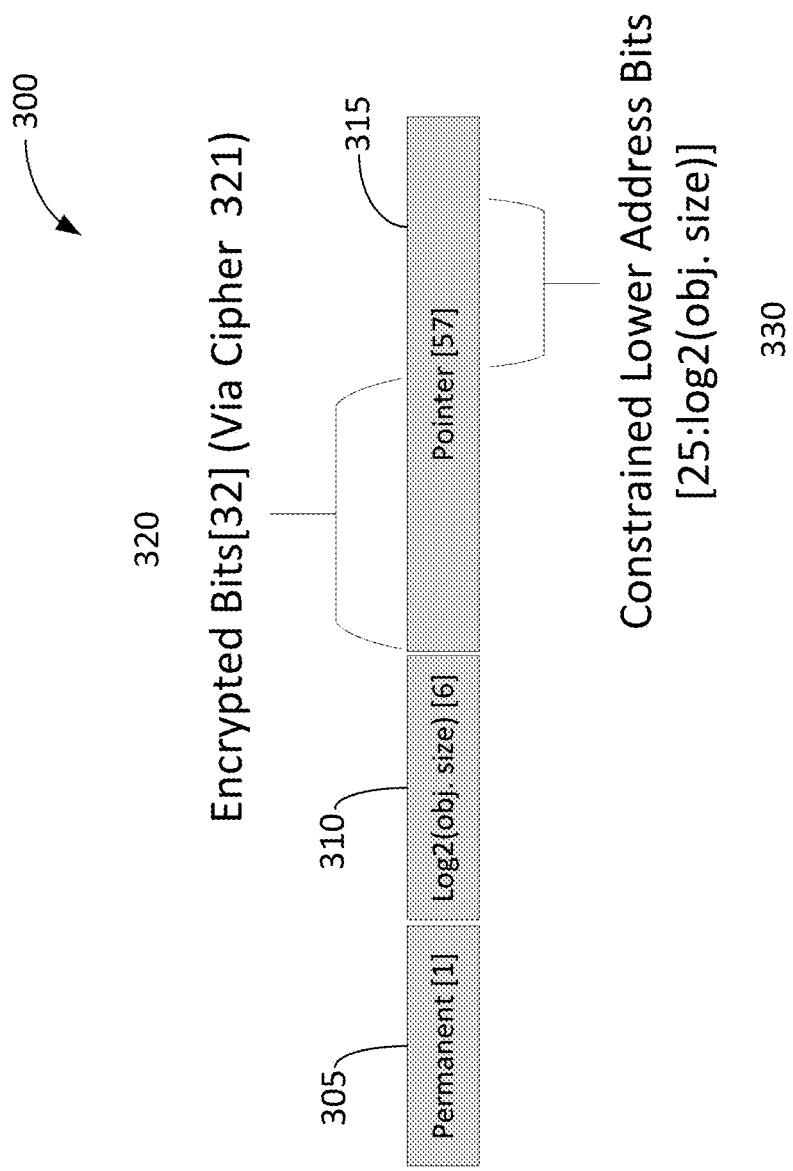
FIG. 3 illustrates an encrypted pointer according to various embodiments.

Referring now to FIG. 3, an example encrypted pointer 300 according to various embodiments, is shown. Because, in embodiments, encrypted pointers grant access to a region of memory, they are used herein interchangeably with the term "capability." As shown, a capability may also contain metadata, as shown in fields 305 (indicating permanent or transient) and 310 (indicating size of object pointed to). Capabilities grant access to a memory block or branch destination in a particular protection domain using a key controlled by a root PD (defined to be a PD with PDID 0). In embodiments, the key may be accessible via instructions for accessing processor internal registers. For example, via RD/WRPKR instructions in the root PD to a pair of user mode control registers, or via RD/WRMSR instructions in the root PD to a pair of model-specific registers, or via instructions that access some other storage mechanism.

Continuing with reference to FIG. 3, in embodiments, a capability may comprise three fields. A Permanent field 305, an Object Size field 310, and a Pointer field 315. The "Permanent" field 305 may include a single bit, which may select between one of two encryption keys: one for capabilities that never expire, and another for capabilities that are valid for only a defined time period, known as an epoch, as described in more detail below. Object Size field 310 may comprise 6 bits, which specify the log 2 of the size of the object that the capability grants access to. Thus, objects up to $2^{63}$ bytes may be specified by this field. Finally, Pointer 315 contains a memory address. In embodiments, the address may comprise 57 bits, such that the entire capability comprises 64 bits, and is thus equal in size to a conventional pointer on a 64-bit computing machine, which is beneficial for reducing the needed compiler, library, and application changes and for conserving pointer storage space.

In embodiments, only a part of the pointer address may be encrypted so that some of the unencrypted lower address bits may be freely modified. In the example of FIG. 3, only the upper 32 bits are encrypted, as shown at Encrypted Bits[32] 320. In embodiments, these bits may be encrypted using a cipher 321. It is noted that a cipher is an algorithm for performing encryption or decryption. In alternate embodiments, ciphers with different block sizes may be used, and thus Encrypted Bits 320 may have different values. Capability 200 thus grants a process or microservice access within a power-of-two aligned memory region of some size, as specified in Object Size field 310. The value of Object Size 310 may also be used, in embodiments, to determine the number of unencrypted bits 330 that are constrained. As shown in FIG. 3, the Constrained Lower Address Bits 330 are given by [25: log 2(obj.size)], in number, 25 less the value of Object Size field 310. Object Size field 310 thus has the direct effect of controlling how many of the unencrypted lower address bits get incorporated into a tweak, used in the encryption/decryption of the pointer. In embodiments, the tweak may be dynamically generated by both the encryption and decryption instructions described above in connection with FIG. 1B and fed into the encryption and decryption algorithms as part of the key input.

In embodiments, the tweak may influence a ciphertext for the encrypted address bits of Pointer field 315. Thus, if any of the tweak bits are modified, that will result in a different plaintext for the upper address bits when a program attempts to use capability 200. As noted above, a capability may be a data capability or a code capability. In embodiments, code capabilities that specify authorized entry points into protection domains (e.g., into a function that resides in a private region of memory allocated to a given PD) may be defined to have size 1, and thus may have an Object Size field 310 of 0.

In embodiments, a tweak may comprise:
The PDID authorized to use the capability (32 bits);
Zero-padded, right-aligned constrained lower address bits (25 bits);
Size[4:0] (5 bits), and an additional size bit, size[5]; and
Reserved (1 bit).

It is noted that the PDID of the PD for which the capability is generated is included in the tweak in case the capability leaks to another PD. Additionally, the additional size bit, size[5] is only relevant for determining whether the runtime needs to mediate access to the capability. In embodiments, the highest value of the size field that can be handled directly by a decryption instruction (e.g., a DECDCAP instruction) without the intervention of the root PD may be set to 25, which is represented in binary as 011001. Thus, if size[5] is set, then the object must be so large that the root PD must intervene to check attempted accesses to it. However, in embodiments, there may also be object sizes that must be handled with the intervention of the root PD that do not have size[5] set if their sizes are simply stored in the size field. Thus, for simplicity, in some embodiments it may be desirable to set the size field to 100000 for all sizes greater than 25 and to cause DECDCAP to transfer control to a handler in the root PD if size[5] is set. Alternatively, in other embodiments, the size may be stored in the size field, and a decryption instruction, e.g., DECDCAP, may invoke the handler in the root PD if the value of size is greater than 25.

In embodiments, Encrypted Bits 320 may be encrypted with any cipher 321 that supports small block sizes (e.g., 32 bits) and accepts a 64-bit tweak. In alternate embodiments, the 32-bit PDID may be omitted, and thus such alternate embodiments may only use a 32-bit tweak.

It is here noted that an advantage of encryption and decryption as disclosed herein is that it is largely compatible with conventional, non-capability machines, and the capability machine semantics may be implemented entirely by a small set of new instructions, as described below. In embodiments, when capabilities are used, they are first transformed into ordinary pointers by new instructions, and then those ordinary pointers are passed to ordinary instructions in an underlying Instruction Set Architecture (ISA) (e.g., IA-32). This process is illustrated in FIG. 4, which depicts a process of decryption of each of a data capability and a code capability, using e.g., new/dedicated instructions, DECDCAP and DECCCAP, by a runtime environment 410, in accordance with various embodiments.

Figure 4:
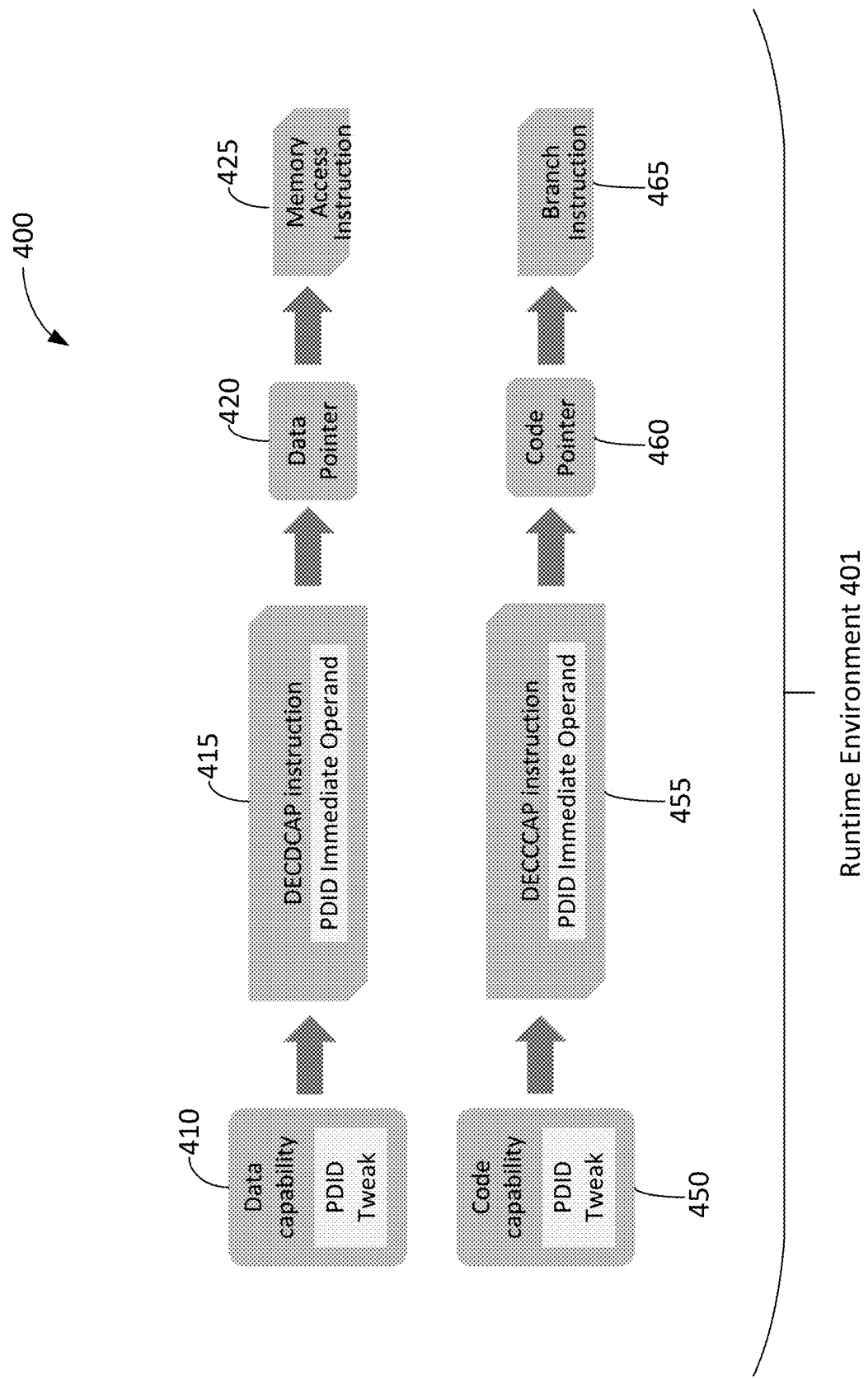
FIG. 4 illustrates conversion of encrypted pointers, such as shown in FIG. 3, into an ordinary pointer, and passing of the ordinary pointer to standard instructions, according to various embodiments.

With reference to FIG. 4, a data capability 410 and a code capability 450 are shown. In embodiments, these capabilities may have the form of capability 300 of FIG. 3. Beginning with the top row of FIG. 4, data capability 410, together with the PDID of the PD seeking to access the underlying pointer, may be input to a DECDCAP instruction 415. As shown in FIG. 4, the instruction also takes as an immediate input the PDID. However this is optional, and in alternate embodiments decryption instructions may not take PDID as an input. In embodiments, the output of the execution of a data object decryption instruction 415, e.g., DECDCAP, is a standard, unencrypted, data pointer 420, which may then be passed to a Load or Store instruction 425 in the normal course. Similarly, with reference to the bottom row of FIG. 4, code capability 450, together with the PDID of the PD seeking to access the underlying pointer (optionally) may be input to a code capability decryption instruction 455, e.g., DECCCAP. As above, the instruction may optionally take as an immediate input the PDID. In embodiments, the output of the execution of a code capability decryption instruction 455 may be a standard, unencrypted, code pointer 460, which may then be passed to a Branch instruction 465 in the normal course. FIG. 4 shows, for both data capability 410 and code capability 450, a tweak as an input. It is noted that in embodiments, the tweak is actually computed by DECDCAP and DECCCAP from their respective inputs, and need not be provided as a separate input.

In embodiments, a capability may be created by a new or dedicated instruction, e.g., an "ENCCAP" ("encrypt capability") instruction. Such ENCCAP instruction may have the following syntax:

ENCCAP r64, r/m64, imm32, where the immediate operand (imm32) specifies the PDID of the PD seeking the capability, r/m64 is a source operand, and r64 is the destination operand specifying where the output capability should be stored. If the immediate value is zero, then, in embodiments, a register, e.g., EAX, may implicitly be used as a source operand whose contents specify the PDID. In embodiments, if a register is used as the source operand, a code capability may be created.

Otherwise, if the source operand specifies a memory operand, then the truncated contents of the base register (or zero, if no base register is specified) may be used as the address portion of the capability (e.g., Pointer 215 in FIG. 2, and the offset (scale*index+displacement) may be used as the object size. As noted above, if the object size is 1, a code capability is created. Alternatively, the ENCCAP instruction can be defined such that if a base register is not used, a code capability is created using the truncated effective address as the address portion of the capability. The final contents of the destination register are the encrypted capability. If a certain indicator is provided to the instruction, such as the zero flag being set or the REP instruction prefix being used, then a permanent capability is created. Otherwise, a current per-epoch key may be used to encrypt the capability.

In embodiments, a general protection fault may be generated if the specified capability cannot be represented (e.g., the object size is not a power-of-2), or if the process is not running in the root PD and the provided pointer and object size would grant access to memory outside the bounds of the current PD. Alternatively, the ENCCAP instruction could set the size[5] bit in such circumstances and not encrypt the capability to indicate that accesses using the resultant capability must be mediated by a runtime-provided authorization routine as is described below for regulating accesses to objects that are too large to be represented using an encrypted capability.

In embodiments, a runtime loader, such as runtime loader/manager 250 in FIG. 2, may scan all code to ensure that all uses of ENCCAP in the code refer only to stack and global allocations and functions for the PD containing that instance of ENCCAP. However, in embodiments, the root PD's use of ENCCAP is unrestricted.

It is noted that shared objects larger than 32 mebibytes (MiB) cannot be represented directly with a single capability but 32MiB slices of an object may each be represented. (This is because an encrypted slice of pointer bits is provided in the middle of a pointer. If it was attempted to represent a 64MiB object and then also attempted to increment the resultant capability by 32MiB or more, the least significant bit of the encrypted slice would get flipped. That would result in a corrupted plaintext when that slice is subsequently decrypted. Similar reasoning applies to all object sizes larger than 32MiB.)

Otherwise, in embodiments, a root PD that generates capabilities to objects in a shared heap may be invoked to mediate access to a larger object. For example, in embodiments, a root PD may implement a function that can be invoked by other PDs to request approval for accessing a particular range of addresses within some large object. In such embodiments, the runtime loader may be required to scan code as it is loaded to ensure that all accesses to the large objects are preceded by appropriate requests to the root PD for approval. It is noted that, in embodiments, this authorization routine may also be used to regulate accesses to regions of memory that contain objects that are not necessarily aligned on power-of-2 boundaries and hence cannot be directly regulated using a DECDCAP instruction (as is evident by the Size constraint 310 of power-of-2 object boundaries). In embodiments, if an ENCCAP instruction is used to generate a capability for such a large or unaligned object, it can set the size[5] bit to indicate that the capability is unencrypted. Alternatively, since the capability is unencrypted, in embodiments, the software may generate it directly without using an ENCCAP (or equivalent) instruction.

In embodiments, a specification for a DECDCAP (data capability decryption instruction) may be as follows:

DECDCAP r64, m64, imm32, where, as in the case of the ENCCAP instruction described above, the immediate operand (imm32) specifies the PDID of the PD seeking the capability, m64 is a source operand, and r64 is the output capability, now a decrypted, standard pointer. In embodiments, a general protection fault may be generated if the source operand m64 specifies a data size smaller than 2. In embodiments, as noted above with reference to FIG. 3, execution of DECDCAP results in decrypting the capability from the base register and placing it in the destination operand, and also comparing the constrained address bits of the effective address to those in the base register. In embodiments, if the two differ, a general protection fault, or a BOUND Range Exceeded fault, may occur.

As described above with reference to FIG. 3, execution of a DECCCAP results in decryption of the capability in the source operand and placement of the decrypted code pointer in the destination operand. In embodiments, a general protection fault may be generated if the capability in the source operand specifies a data size other than 1.

In embodiments, a software runtime environment may scan code for each PD as it is loaded to ensure that any use of a pointer is preceded by an appropriate DECDCAP or DECCCAP instruction, depending on whether the code that follows the instruction uses the pointer for a data access or a branch.

As an example, the following pseudocode illustrates how a DECDCAP instruction may be used in embodiments (at entry, encoded pointer stored in RAX):

```
...
DECDCAP 69, 7(%RAX), %RCX ; Decrypt pointer from RAX and load
into RCX, specifying PDID 69 and an access size of 8. 7 is specified to
    enable computation of the highest address that may be accessed.
MOV (%RCX), %RDX ; Load from object
...
```

Figure 5:
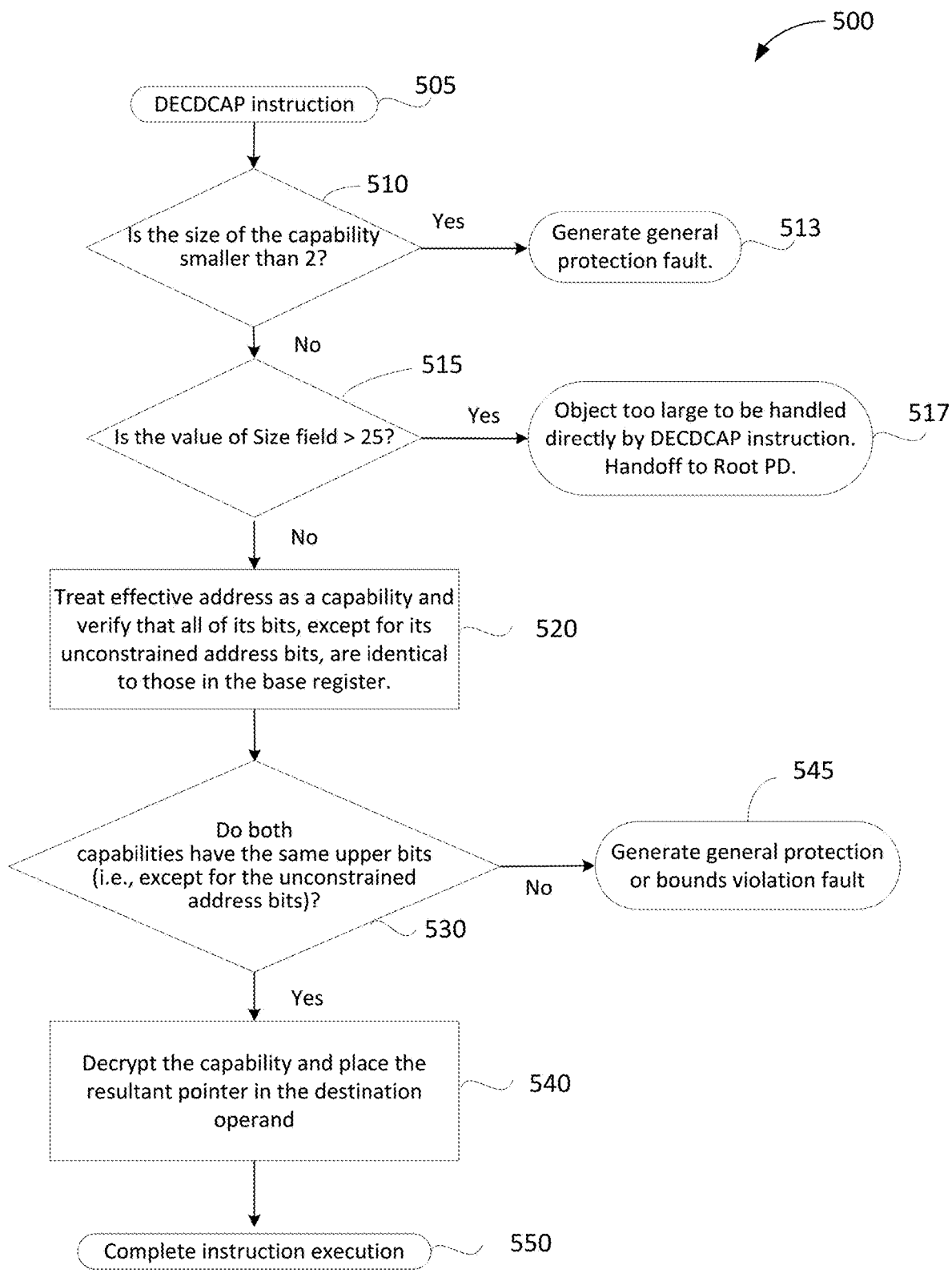
FIG. 5 illustrates an overview of the operational flow of a process for executing a decryption instruction, in accordance with various embodiments.

Summarizing the above, FIG. 5 illustrates an overview of the operational flow of a process for executing a DECDCAP decryption instruction by a processor executing a program or application within a runtime environment, in accordance with various embodiments. With reference to FIG. 5, Process 500 may begin at block 505. At block 505 a DECDCAP instruction, which takes as inputs an encrypted capability and a PDID, may be decoded by the processor for execution. From block 505 Process 500 may proceed to query block 510 where the processor may determine if the size of the capability is smaller than 2. In embodiments, this may be done by reading Object Size field 310 of the capability as shown in FIG. 3. If Yes at query block 510, then the encrypted capability is not a data capability, and Process 500 may declare a general protection fault at 513 and Process 500 may then terminate. However, it is here noted that in alternate embodiments, where code capabilities are not supported by the processor (i.e., if encrypted pointers are only used to represent data object bounds), then single-byte data capabilities may be supported, and query block 510 (and block 513) may be eliminated).

If, however, the result at query block 510 is No, then the capability is a verified data capability, and Process 500 may proceed to block 515 where Process 500 may check whether the value of the size field is greater than 25. If Yes at query block 515, then the object is too large to be handled directly by DECDCAP and the root PD must intervene to check whether the access is allowable by consulting its internal data structures in software. In such a case, Process 500 may transfer control to a handler in the root PD whose entrypoint instruction address may be specified in an internal CPU register, and following that hand-off, at 517 Process 500 may terminate.

If No at query block 515, then Process 500 may proceed to block 520 where the runtime environment may, as a check, treat the effective address as a capability and verify that all of its bits except for its unconstrained address bits are identical to those in the base register. It is here noted that the effective address represents the highest address to be accessed within the object, and thus this comparison serves as a bounds check. If the constrained address bits differ, then it is likely that erroneous, malicious, or compromised code added or subtracted too large a value to or from the capability such that the attempted access based on the modified capability is no longer within the bounds of the object to which it refers. where the runtime environment may decrypt the capability and place the resultant pointer in the specified destination operand. From block 520 process 500 may proceed to query block 530, where it may be determined if both the capabilities have the same upper bits above the size of the object specified in the capability. If Yes at 530, process 500 may proceed to block 540, where the execution of the instruction is completed, and process 500 may end. If, however, the result at query block 530 is No, then process 500 may proceed to block 545, where the runtime environment may generate a general protection or "BOUND Range Exceeded" fault, and Process 500 may terminate.

In connection with the bounds test of query block 530 of process 500, it is noted that even if the bounds test within DECDCAP fails to detect some corrupted or out-of-bounds data pointers, they are likely to decrypt to point to an unmapped memory location in a large address space, which will result in detectable page faults. In embodiments, software runtime may respond to such a page fault by terminating the process that caused the fault. Similarly, a corrupted code pointer is likely to result in a branch to an unmapped memory location, also resulting in a page fault. In embodiments, even stronger assurances are possible if technologies such as Intel® Corporation's Control-flow Enforcement Technology (CET) is enabled, because the probability of a corrupted code pointer landing on an END-BRANCH instruction is very small.

As noted above, additional metadata such as memory access permissions and protection key IDs may be stored in a capability and information about the attempted access (e.g., whether a read or a write is about to be attempted) can be specified to DECDCAP instructions so that the DECDCAP instruction can check that the attempted access is permissible according to the metadata in the capability and generate a fault if it is not.

In embodiments, software runtime and applications may be run within a Trusted Execution Environment (TEE), e.g. Intel® SGX, to defend the software runtime and the applications against the types of attacks that are in scope for the TEE in use.

As noted above, in embodiments, separate keys may be assigned by the runtime environment for each of permanent capabilities and per-epoch capabilities. In embodiments, one or more sequences of epochs may be defined for each logical processor. In embodiments, each processor may maintain a separate per-epoch key to avoid overhead from synchronization if each processor can run an independent PD. However, if some PD needs to run on multiple processors, then all of the processors running the PD must use identical per-epoch keys.

It is noted that by defining epochs according to various embodiments, one of the most significant drawbacks of classical capability machines, such as those that use fat pointers and tagged memory, may be overcome. That drawback is capability revocation, i.e., the problem of rescinding capabilities after they have been granted. Unlike systems with centrally-controlled memory authorization structures such as page tables, capability machines disperse authorization tokens (capabilities) throughout memory with no easy way of tracking them all down. The use of epochs causes capabilities to automatically expire after their epoch has ended, regardless of where they may be stored. This is an especially good fit for microservices, which typically operate in a reactive, event-driven fashion. In embodiments, a new session may be generated each time a new event arrives, so that the current epoch is associated with the current session.

Summarizing the above description, the following is an illustration of the integer array example described above. It is assumed that original source code of an example program includes an array sorting function represented by the following pseudocode:

---

Program part A pseudocode:

```
{
int nums[5] = {34, 15, 64, 7, 9 };
sort(nums);
}
sort(int[5] array) {
while (array is not sorted) {
for (int i = 0; i < 4; i++) {
if (array[i+1] < array[i]) {
swap(array+i, array+i+1);
}
}
}
}
```

---

In embodiments, the array capability may be generated, transmitted, and used as follows. The int array pointer shown above in Program part A may, for example, be encrypted using ENCCAP, which may output an encrypted capability to access the array. The capability may be provided to a call stack of an executing program, which will then call the sort function, as provided above. Because the pointer to the array is now encrypted, a DECDCAP instruction needs to be used to decrypt the encrypted pointer to the object int nums. Once DECDCAP is executed, an unencrypted pointer, int array pointer is generated, and that unencrypted pointer may be used by the code for sorting the array object.

Thus, in embodiments, the original source code may be transformed by the compiler into actual source code based on the following pseudocode:

```
Pseudocode for Instrumented Program part A:
{
int nums[5] = {34, 15, 64, 7, 9 } aligned to the least power-of-2 that is
adequate for storing nums;
nums_capability = ENCCAP(nums, sizeof(nums));
sort(nums_capability);
}
sort(int[5] capability array) {
while (array is not sorted) {
for (int I = 0; I < 4; i++) {
array_i_ptr = DECDCAP(array+I, sizeof(int));
array_i_plus_1_ptr = DECDCAP(array+i+1, sizeof(int));
if (*array_i_plus_1_ptr < *array_i_ptr) {
swap(array+i, array+i+1);
}
}
}
}
```

Thus, in embodiments, the two-stage encryption/decryption scheme embodied in, for example, the ENCCAP and DECDCAP instructions represents a mechanism for one part of a computer program to transmit an authorization to another part of the program to access a certain piece of memory. It is noted that without such a scheme, some other mechanism would need to be created to either explicitly transmit that authorization between different parts of the program, or to somehow infer whether each memory access is authorized. To understand why this is challenging, it is here noted that each program statement that accesses memory through a pointer may need to use many different pointers. For example, the sort function in the example described above is generic, so it could be invoked from many different parts of a given program to sort many different arrays.

Figure 6:
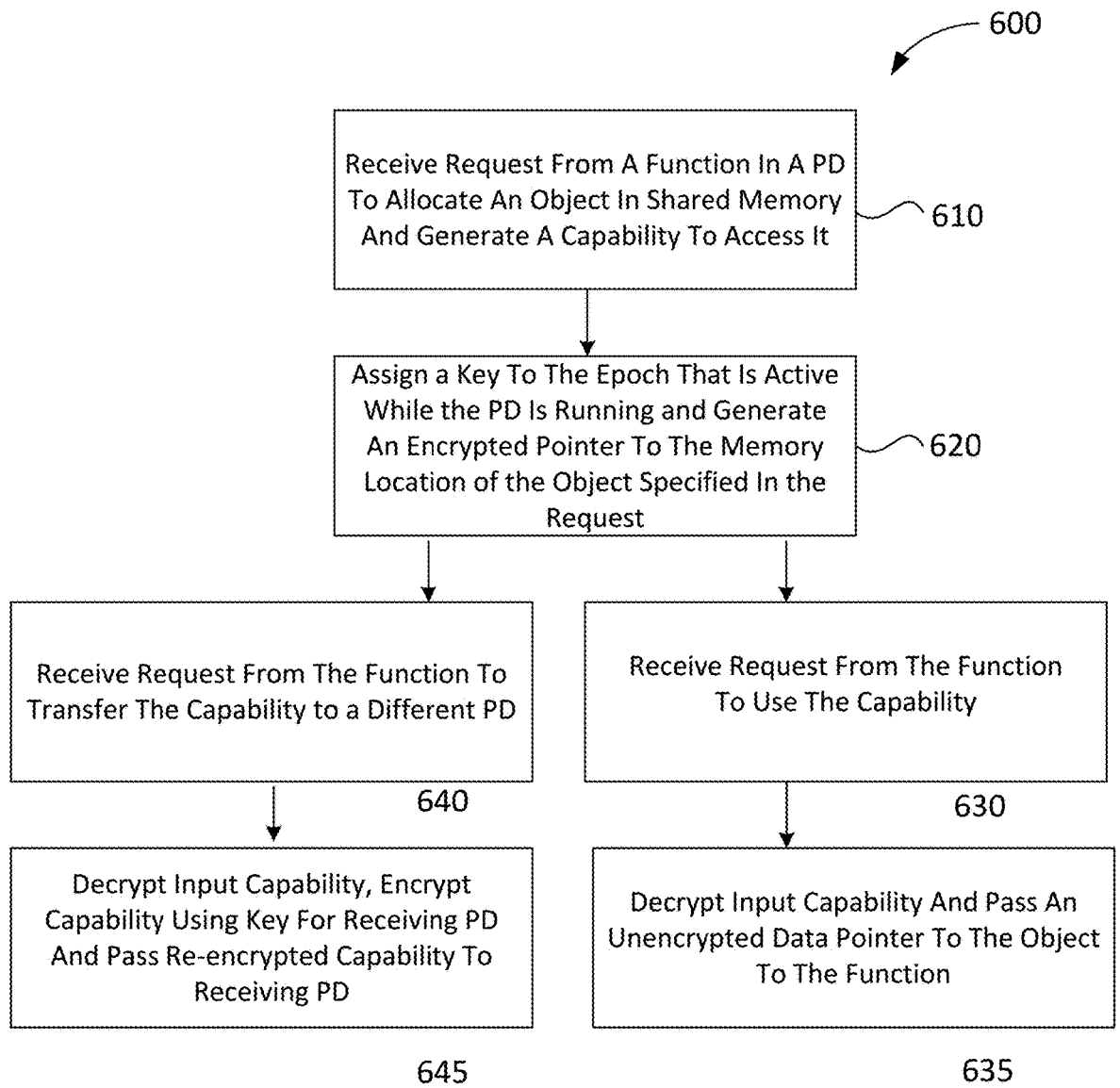
FIG. 6 illustrates an overview of the operational flow of a runtime process for handling memory access requests, in accordance with various embodiments.

FIG. 6 illustrates an overview of the operational flow of a runtime process for handling memory access requests and associated capabilities, in accordance with various embodiments. With reference to FIG. 6, process 600 may begin at block 610. At block 610 a runtime environment (e.g., the runtime environment of the compiler of FIGS. 1A-1B) operating on a computer system may receive a request from a function of an application in a given PD managed by the runtime environment to allocate an object in shared memory of the computer system and to generate a capability to access it. From block 610 process 600 may proceed to block 620, where the runtime environment may assign a key to the PD and generate an encrypted pointer to the memory location of the object specified in the request. It is here noted that in embodiments the key may be assigned to the epoch that is active while the PD is running. In embodiments, the key may be assigned at the time that the epoch begins.

The encrypted pointer may be generated by an inserted encryption instruction (e.g., ENCCAP), as described above, and may encrypt the pointer with, inter alia, the PDID of the requesting PD and the key, as described above. As noted above, the key may persist, or may expire at the end of an epoch.

From block 620 where an encrypted pointer is generated, process 600 may bifurcate into two branches, one where a function in the PD requests to use the capability, the other where a function in the PD seeks to transfer the capability. Thus, in the first branch, process 600 may proceed from block 620 to block 630, where the processor may receive a request from a function in the PD to use the capability. Prior to making such a request, for example, the function may have altered the pointer address of the capability in either a legitimate way, such as by changing bits of the pointer field of the capability that are unconstrained, or for example, in an illegitimate way, by changing constrained bits.

From block 630 process 600 may proceed to block 635, where the capability may be decrypted and converted to an unencrypted pointer, and passed to a standard instruction. At block 650 process 600 may end.

Alternatively, proceeding along the second branch, process 600 may proceed to block 640 where the function in the PD indicates that it wishes to transfer the capability to another function, in another PD (this is the situation of Example 7 of FIG. 9A, described below). Then process 600 may proceed from block 640 to block 645, where the runtime environment may decrypt the capability, encrypt the now unencrypted capability using the key for the receiving (transferee) PD if the receiving PD is currently running and awaiting an incoming capability, and pass the re-encrypted capability to the receiving PD. At block 645, process 600 may end. However, if the receiving PD is not yet running, or is not ready for an incoming capability, in embodiments, the decrypted capability may be enqueued with information specifying the identity of the receiving PD. When the receiving PD becomes ready for an incoming capability, then the decrypted capability may be encrypted using the key for the receiving PD and is transferred into the receiving PD. For example, the receiving PD may accept an incoming capability as a parameter to its startup routine. Alternatively, the receiving PD may use calls to runtime APIs to indicate its readiness to receive an incoming capability at a certain point in its execution.

As noted above, a capability may be permanent, or may be valid only for a. For capabilities that are only valid for an epoch, in embodiments, to minimize the time required to replace a current epoch key with a new one, a processor or CPU may begin to generate a new epoch key as soon as another one is installed. For example, this can be implemented by a new/dedicated "INCEPOCH" instruction that loads the pre-cached epoch key and starts generating a new one. In embodiments, an INCEPOCH instruction may be executed when one epoch has completed and another epoch is about to begin. In embodiments, INCEPOCH may be executed prior to executing an ENCCAP instruction (or an equivalent) for each of the capabilities that are provided as inputs to the next epoch so that those capabilities are encrypted using the appropriate key. This process is illustrated in FIG. 7, next described.

Figure 7:
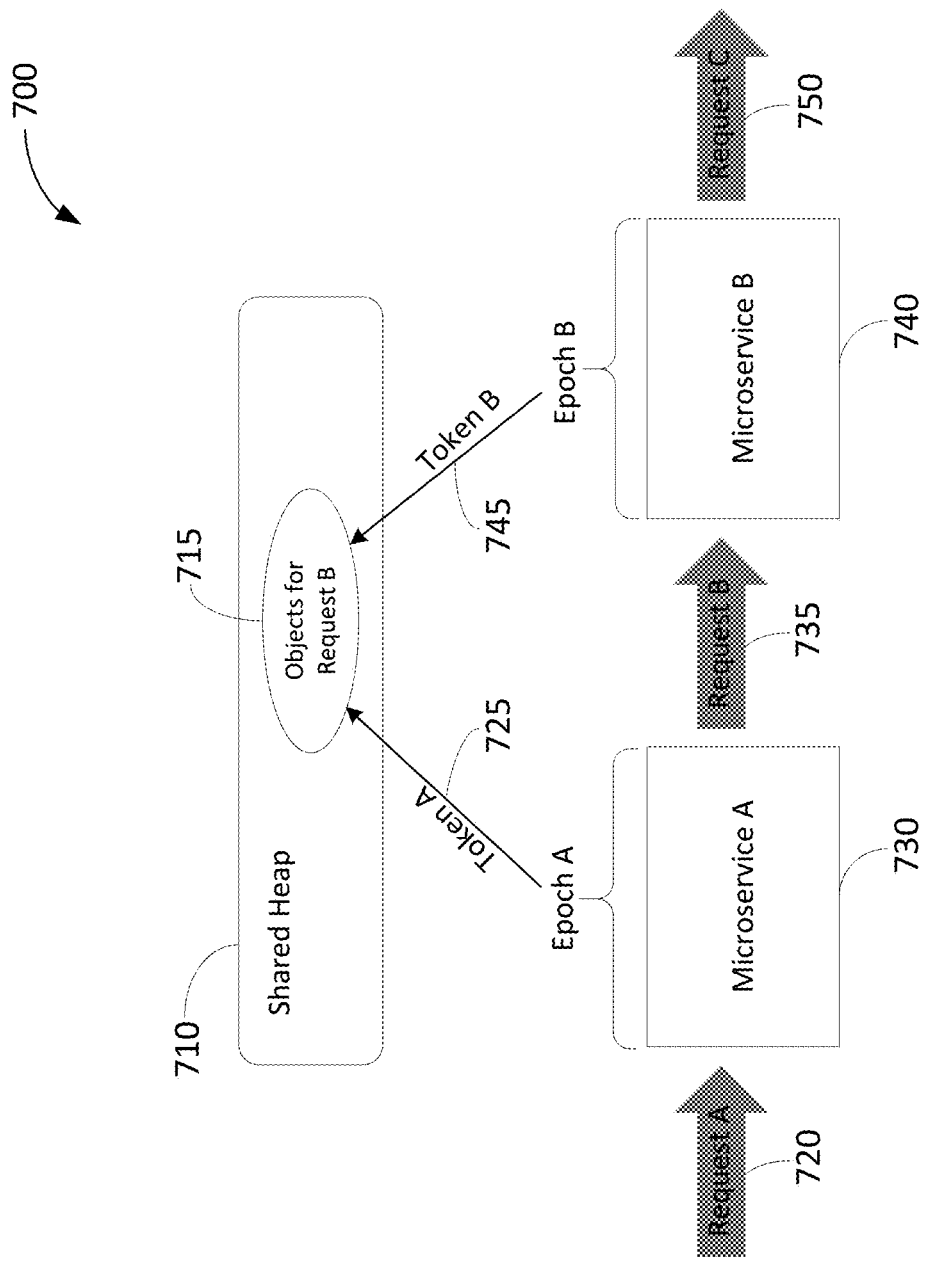
FIG. 7 illustrates an optimization implemented by loading a pre-cached epoch key and generating a new one, in accordance with various embodiments.

With reference to FIG. 7, there is shown a Shared Heap 710, in which an Object 715 is stored. Shared Heap 710 is analogous to Shared Heap 140 of FIG. 1, described above. As shown, two microservices, Microservice A 730 and Microservice B 740, each have access to Shared Heap 710, and may each need access to Object 715. Microservice A 730 and Microservice B 740 are analogous to Service PD #1 120, and Service PD #2 130 of FIG. 1, described above.

Thus, Microservice A 730 and Microservice B 740 may each be assigned a separate PD by the runtime environment.

Upon receiving a first request, Request A 720 issuing from Microservice A 730, the runtime environment may decrypt the request and issue Token A 725, for example, an unencrypted capability based on decryption of Request A 720, as described above. For example, the runtime environment may execute a DECDCAP instruction previously placed in the compiled code of an application running in Microservice A 730, as described above. Token A 725 may grant Microservice A 730 access to Object 715 for a single epoch, Epoch A 721, as shown. At some later time Microservice A 730 may seek to transfer access to Object 715 to Microservice B 740. For example, object 715 may be an employee record, and following some processing of the record, Microservice A 730 may pass it to Microservice B 740 for further processing. In embodiments, rather than grant both microservices access to an object in a shared heap at all times, for greater security, each microservice's access to an object may be controlled, as described above, using encrypted pointers.

Continuing with reference to FIG. 7, after Microservice A 730 has completed its processing of Object 715, it may request that the object be passed to Microservice B 740, as noted. It thus may issue Request B 735, in the form of an encrypted pointer or capability, that transfers access of Object 715 to Microservice B 740. The request may be decrypted by the runtime environment, and transformed to Token B 745, which now grants (sole) access to the object to Microservice B 740. As in the case of Microservice A, the access granted by Token B 745 may be time-limited, only lasting for the duration of Epoch B 741. As shown, the process may continue, and an application running as part of Microservice B 740 may seek to transfer access to Object 715 back to Microservice A, or to a third microservice, via Request C.

In embodiments, in order to manage which capabilities are valid during a given epoch, each logical processor may be assigned metadata associated with each shared object. In embodiments, a table of shared objects per epoch may be maintained, and garbage collection metadata may be stored in the table. In embodiments, if the whole or part of an object is referenced by any capabilities in the current epoch or permanent capabilities on that logical processor, or, for example, if the object is queued up to be sent to some other PD in the scheduling queue for that logical processor, then the metadata for that shared object may indicate that fact. In embodiments, when the metadata for some object indicates that the object is no longer referenced by any transient or permanent capabilities or present in any scheduling queues for any logical processors, then the object can be freed. In embodiments, at the end of each epoch, the root PD may update metadata for the logical processor on which it is running, clearing the metadata that indicates that transient capabilities exist for objects used in the epoch that is ending. Additionally, in embodiments, when a message is transferred between scheduling queues, metadata for the referenced objects may be updated appropriately; i.e., the metadata for the logical processor of the sending queue that indicates that the object is enqueued for that logical processor may be cleared and metadata that indicates that the object is enqueued for the logical processor of the receiving queue may be set.

It is here noted that for the case where some capabilities are permanent for an object in shared memory, in order to transfer that object to another PD, additional capabilities, either permanent or transient, may be generated to refer to objects currently referenced by permanent capabilities.

Next described are details of an exemplary software runtime environment that may be used in accordance with various embodiments. As an example, a VM-based runtime can be developed to efficiently host microservices. However, it is to be understood that similar implementations may be applied to other foundational runtime environments.

In embodiments, a runtime library in PD 0 may provide a number of services, including capability creation, garbage collection, scheduling and epoch maintenance, and message passing between PDs, as well as over a network. In embodiments, for convenience, some services may be implemented in a VM userspace monitor rather than as a guest VM. In such implementations, certain enhancements to existing functions may be provided. First, for example, the runtime dynamic loader in the VM userspace monitor may be extended to install new PDs packaged as relocatable ELF files into an existing guest VM after scanning them to verify basic trustworthiness. Second, for example, an EPT violation handler or a page fault handler may monitor for erroneous/malicious access attempts and terminate PDs as necessary. Third, for example, a VT-x preemption timer handler may be used to abort any PD that exceeds its time slice. It is here noted that a PD in a non-pre-emptible, event-driven execution model may not be suspended and resumed, because it may hold capabilities to objects in a shared heap that may have expired and been "garbage collected" by the time the PD resumes.

It is noted, however, that preemption may also be supported by saving, and then later restoring, a current epoch key and the runtime state of a preempted service. As a result, in some embodiments, the root PD may not permit any other services to access shared objects for which the preempted epoch holds capabilities. (It is here noted, however, that other PDs may also have capabilities granting access to the objects. In that case, those other PDs may continue to access the objects even while the first PD is preempted.) This would require more information about each object to be stored in the table that manages garbage collection. For example, each epoch could be assigned a monotonically-increasing numeric ID, and the ID for the latest epoch in which the object may be used could be stored in the garbage collection metadata table. That would permit assigning a very large epoch ID for a preempted epoch for each object that it refers to with a transient capability so that the objects to which it refers would not be garbage collected.

In this approach, when a PD is granted access to an object, in embodiments, the stored epoch ID in the garbage collection metadata table may only be updated if the epoch ID for the PD being granted new access is greater than the current epoch ID in the garbage collection metadata table for that object. Alternatively, an indicator may be attached to the garbage collection metadata table entry for each object that is referenced by a transient capability in the preempted epoch that indicates the number of preempted epochs that reference the object. In embodiments, a separate data structure may be attached to each preempted epoch indicating which objects it refers to with transient capabilities. When the preempted epoch is eventually resumed, the centralized garbage collection metadata for the objects referenced by that epoch using transient capabilities would be updated to reduce the indicator of the number of preempted epochs that reference the objects and to update the active metadata to indicate that the current epoch references the objects.

Fourth, for example, system call and hypercall handlers may be enhanced to receive and check capabilities rather than pointers. The root PD may configure the OS kernel or the VMM with the capability encryption keys for the current PD to enable checking and use of capabilities by system call and hypercall handlers. Alternatively, the OS may perform an upcall to the root PD to request the current capability encryption keys. Alternatively, the OS may rely on the processor already being configured with the appropriate capability encryption keys so that it can use encryption and decryption instructions (e.g., ENCCAP and DECDCAP instructions) to process capabilities.

In embodiments, a root PD may offer an API to other services such as, for example: send(dest. PDID, message capability from shared heap). This service may check that the message capability has not already been enqueued to enforce exclusive ownership for capabilities, and may queue the message in the queue for the current logical processor to be sent at the next opportunity.

In embodiments, the root PD may also offer to an API a yield( ) service, that may complete a current epoch and invoke the scheduler or cause the current epoch to be preempted. In embodiments, the scheduler may create new capabilities and coordinate safe garbage collection. Thus, if no messages are waiting in the queue for the current logical processor, the scheduler may steal some from other logical processors with appropriate synchronization.

In embodiments, the scheduler may further copy a message capability so that the destination PD can access it, and finally, the scheduler may jump to the entry point of the destination PD (for example, as may be specified in an ELF file and stored by the runtime environment in a PD information structure), passing message capabilities on the stack.

It is noted that in embodiments, a runtime environment may use a service addressing mechanism that supports location transparency, such as, for example, IP addressing or Globally-Unique Identifiers (GUIDs), to permit services to send messages to other services both within the same runtime environment instance and in other instances, which may, for example, be located remotely. In embodiments, the runtime environment may automatically detect when a message needs to be directed to a different runtime instance, and may perform the necessary serialization and network communication to accomplish that transfer.

Figure 8:
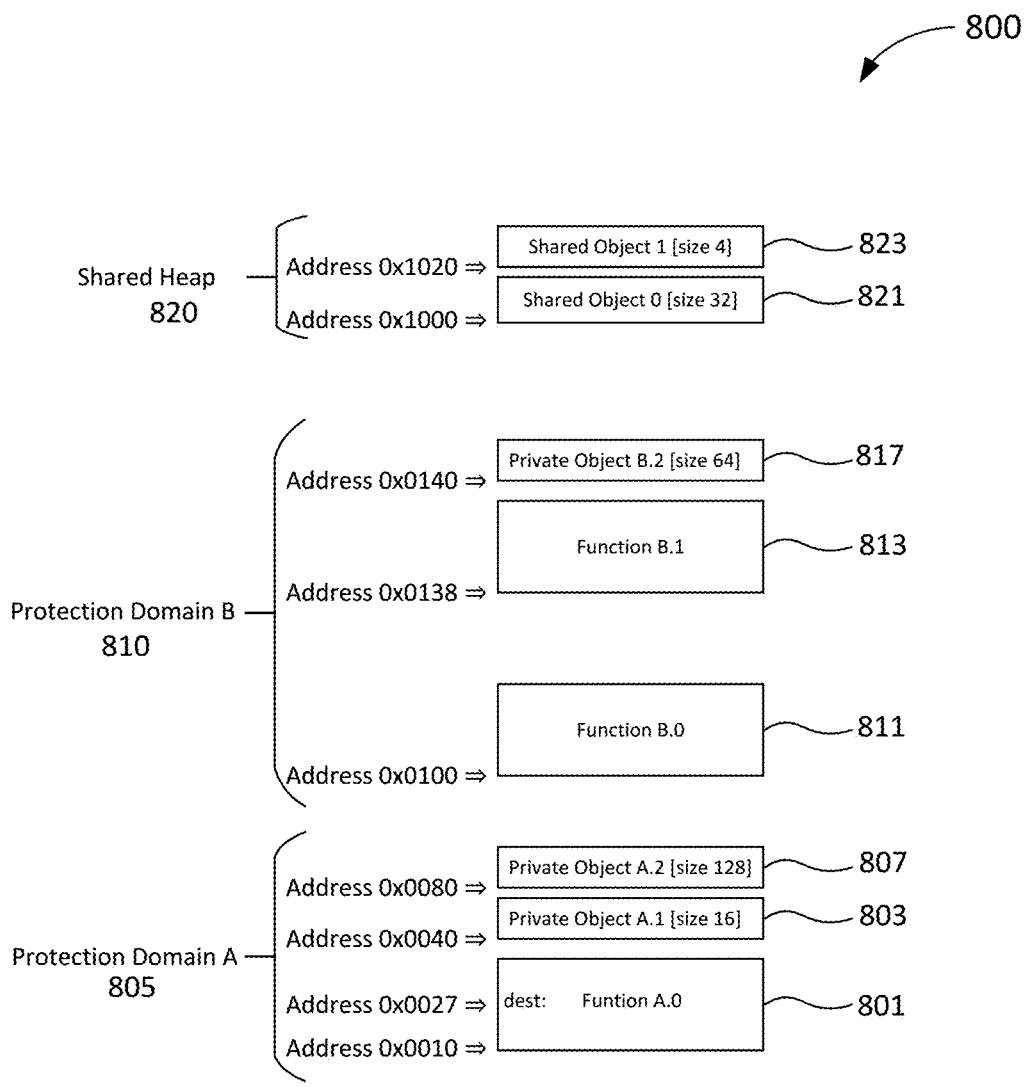
FIG. 8 illustrates an example memory layout including a shared heap and two example protection domains, in accordance with various embodiments.

Next described are several examples of the generation and use of encrypted pointers in a runtime environment to regulate access to shared memory regions in accordance with various embodiments. For ease of illustration, a simplified example memory layout with two protection domains is assumed, each having a private region of memory in which one or more functions may reside. The two protection domains are also assumed to have access to a shared memory region. FIG. 8 illustrates the exemplary memory layout, and FIGS. 9A and 9B illustrate several example pointers generated and/or used by functions residing in the protection domains and how they are handled by the runtime environment. It is noted that FIG. 8 illustrates a similar, but more detailed, memory layout to that illustrated in FIG. 1, described above.

With reference to FIG. 8, there is shown memory region 800. Memory region 800 includes private areas of memory for Protection Domain A 805 and Protection Domain B 810, as well as a shared heap 840 which may be accessed by functions running in either PD. PD A 805 is assigned a private region of the memory, ranging from memory address 0x0010 through 0x00FF. Within that memory region, there is stored Function A.0 801, Private Object A.1 803 (16 bytes) and Private Object A.2 807 (128 bytes).

Continuing with reference to FIG. 8, there is also shown PD B 810, which is assigned its own private region of memory region 800, ranging from memory address 0x0100 through 0x0200. Within that memory region, there is stored Function B.0 811, Function B.1 813 and Private Object B.2 817 (64 bytes). Finally, memory region 800 has an area of memory which functions in both PD A 805 and PD B 810 may access. This is Shared Heap 820, which begins at memory address 0x1000. Shown in Shared Heap 820 are two shared objects, namely Shared Object 0 (4 bytes) 821 and Shared Object 1 (4 bytes) 823.

Given memory region 800 of FIG. 8 and its constituent PDs, next described are ten examples of the use of encrypted pointers in that exemplary environment according to various embodiments. These examples are presented in FIGS. 9A and 9B. FIG. 9A illustrates the encrypted pointers described in examples 1-8, and FIG. 9B illustrates encrypted pointers described in examples 9 and 10. It is noted that in the following description the terms "encrypted pointer" and "capability" are used interchangeably. It is also noted that in the pointer field of each capability shown in FIGS. 9A and 9B, only the unencrypted portion of the memory address is shown, for ease of illustration.

A first example, Example 1, involves encrypted pointer 930 of FIG. 9A. Here Function A.0 of PD A uses an ENCCAP instruction to generate an encrypted code capability for use in an indirect branch preceded by a DECCCAP instruction. It is here recalled that the example ENCCAP instruction, which stands for "Encrypt Capability", may be used to encrypt both data capabilities for controlling memory accesses to objects as well as code capabilities for controlling branches to code. On the decryption side, as illustrated in FIG. 3, a DECCCAP instruction may be used to decrypt an encoded code capability, such as encrypted pointer 930. As described above with reference to FIG. 2, the example pointers of FIGS. 9A and 9B each have a Permanent field, an Object Size field and a Pointer field. Encrypted pointer 930 may be permanent or temporary, as indicated by the "0 or 1" value of the Permanent field. Because encrypted pointer 930 is a code capability, its Object Size field is 1, recalling that the Object Size field provides the log 2 of the actual size of the object. The pointer field contains base address 0x0027, which falls within Function A.0, and which address is shown in FIG. 8 as "destination." Thus, the pointer points to an authorized memory location for PD A, within its private code region.

Example 2 involves an encrypted data pointer 935. Here Function A.0 of PD A 805 uses ENCCAP to generate an encrypted data capability for Private Object A.1 803. Thus, the Object Size field of capability 935 indicates an object 16 bytes long (log 2(16)=4), and the base address of the object specified by the capability is 0x0040, which is the beginning address of Private Object A.1 803, as shown in FIG. 8.

Example 3 involves a revised data capability 940, generated when Function A.0 801 of PD A adds 7 to the capability from example 2. Thus, capability 940 is identical to capability 935, except that the address in the Pointer field is 0x0047, precisely 7 bytes larger than the base address used in capability 935. Because Private Object A.1 803 is 16 bytes in size, 0x0047 properly points to a location within Private Object A.1 803.

Example 4 involves a further change to the encrypted data capability of example 3. Here Function A.0 adds 12 to the capability from example 3, resulting in capability 945. Now, however, the address is out of bounds, having exceeded the size of Private Object A.1 803, which is 16 bytes. Capability 945 now points to an address 0x0053, which is in excess of the ending address of Private Object A.1 803, which is 0x0050. Thus, example 5 involves this out of bounds capability being passed by Function A.0 to a DECDCAP instruction, which generates a fault, given that one of the constrained bits (bit 4) was modified. Recalling the description of FIGS. 2 and 3, in embodiments, a DECDCAP decryption instruction utilizes a tweak as part of the decryption. The tweak specifies the constrained lower address bits, which are calculated as [25−log 2(obj.size)] 230, as illustrated in FIG. 2. Because the size of Private Object A.1 803 is 16 bytes, the constrained bits are calculated as [25:log 2(16)]=[25:4], which means that bits 25:4 of the encrypted pointer are constrained and included in the tweak. Because bit 4 has been now modified in example 4, using DECDCAP to decrypt capability 950 results in a fault, and, in embodiments, the microservice causing the fault, here Function A.0, may be terminated by the runtime.

It is noted that in examples 1-5 the Permanent field of the various capabilities is shown as being either 0 or 1. This is because the data object or code instruction pointed to by the capability is within the private memory area of PD A, and may be permanent. Such capabilities are generated by ENCCAP instructions within PD A, and their lifetimes may either all be set to permanent, or they may be set to transient (i.e., valid for only one epoch) if they are not needed in any future epochs. The benefit of using transient capabilities when possible is that there may be less risk of an erroneous or compromised memory access going undetected, since that memory access is then more likely to attempt to use an expired capability, likely resulting in a detectable fault. The remaining examples, examples 6-10 all have a 0 value in the Permanent field, because the capabilities described involve access to shared objects residing in shared heap 820, and the runtime environment thus only authorizes their use for a defined time. It is understood that alternatively, in embodiments, the runtime environment may authorize their permanent use.

Example 6 involves a request from Function A.0 (of PD A) that the root PD use ENCCAP to generate data capability 955 for Shared Object 0 821 of FIG. 8. Thus, being a shared object, the Permanent field is set at 0, for capabilities only valid for a single epoch. The size field of data capability 955 is 5, for an object size of 32 bytes, and the Pointer field indicates an address of 0x1000, all of which are accurate for Shared Object 0 821, as shown in FIG. 8. The root PD will execute ENCCAP, encrypting the capability with the PDID of PD A.

Example 7 involves Function A.0 now requesting that the root PD transfer the capability described in example 6 to PD B, which has its entry point at the beginning of Function B.0 811. It is here noted that Function A.0, although not having access to PD B, as shown in FIG. 8, may nonetheless be aware of PD B. This is because it is typical for microservices to use a service discovery component to locate services of a certain type that they may need to communicate with. Alternatively, predefined service identifiers (e.g., IP addresses and port numbers, GUIDs, local PDIDs, or local service names) may be embedded within a service as the destinations for certain types of messages. Continuing with example 7, the request by Function A.0 results in the root PD decrypting the input capability using a decryption instruction, such as DECDCAP, as per the process illustrated in FIG. 5, using the encryption key described above, then executing an new key generation instruction, e.g., INCEPOCH, as described above, to create a new encryption key, and finally, using an encryption instruction, e.g., ENCCAP, to generate capability 960 that may be passed to Function B.0. Capability 960 is identical to capability 955 from example 6, except that the encrypted slice of the Pointer field (not shown in capability 960) is now encrypted with a new key generated by INCEPOCH. Alternatively, if PD A is not yet done executing in the current epoch at the time that it issues the request to transfer the capability to PD B, then the capability may be enqueued for later transmission to PD B.

The next two examples are variations on example 7, and therefore numbered as 7.5 and 7.6, respectively.

As noted, example 7.5 involves a variant of example 7. In example 7.5, Function A.0 now requests that the root PD transfer a capability derived from the capability of example 6 to PD B, which has its entry point at the beginning of Function B.0 811. In this example, Function A.0 wishes to only grant access to the first four bytes of shared object 1 823 to PD B, so it uses an instruction that narrows the size of an object of a given capability. In embodiments, this may be a new NARROWCAP instruction, described in detail below. Executing the NARROWCAP instruction generates a new capability with the same base address as the original capability, but now with a shrunken size. Capability 961 is the resultant narrowed capability, showing the same base address as pointer 955, but with the Size field shrunk to 2, representing 4 bytes. The root PD then transfers capability 961 to PD B following processing as described in the latter part of example 7 (i.e., decryption, generation of new key, re-encryption using new key, and either passing to PD B or queueing for later transmission to PD B).

Example 7.6, in yet another variation of example 7, involves Function A.0 narrowing a capability to be passed to one of its internal basic blocks, so as to restrict access to a portion of an object from that basic block. Here Function A.0 only wishes to grant access to the first four bytes of shared object 1 823 to that basic block, so it may use a capability narrowing instruction (e.g., NARROWCAP) to generate a new capability with the same base address as in the original capability, but with a shrunken size. Capability 963 is the resultant narrowed capability, and the basic block of Function A.0 may then use capability 963 for memory accesses to the relevant portion of shared object 1 within that basic block.

Examples 8 and 10 are illustrated in FIG. 9B. With reference thereto, Example 8 involves Function A.0 801 once again invoked by the root PD after Function B.0 completes. It passes capability 955 from example 6 to a DECDCAP instruction. Since the root PD has invoked INCEPOCH after that capability was generated, the result from DECDCAP has a garbled encrypted slice, resulting in a subsequent memory access that is likely to result in a page fault. In other words, even though the originator of capability 955 was PD A, once the capability has been transferred to PD B and a new key generated to be used with the ENCCAP instruction, capability 955 can no longer be used by PD A, unless PD B requests a transfer of the capability back to PD A, in what would be the inverse of example 7. Example 8 thus illustrates that, in embodiments, expired capabilities cannot be successfully reused without a high probability of detection.

Example 9 involves a remote adversary that sends a message over a network to a machine running Function B.0 811 such that a pointer used by Function B.0 811, say pointer P.0, is corrupted. The corrupted pointer, termed "P.0X" for ease of illustration, has the original contents of pointer P.0 overwritten with new contents that are either controlled or specified by the adversary. The adversary's pointer P.0X points to Shared Object 1 823 in an attempt to leak data from Shared Object 1 823, because the adversary has prior knowledge that Function B.0 eventually reads data pointed to by P.0 and sends the read data over the network. However, because all uses of pointers in the program are preceded by a DECDCAP instructions, the adversary's attempts fail. Because P.0 has been overwritten with an ordinary pointer P.0X, attempting to use P.0X will very likely result in an exception—either due to it failing checks in DECDCAP, such as the check illustrated at 540 in FIG. 5, or due to the result of the output of DECDCAP pointing to an unmapped memory address. In other words, because, in embodiments, all pointers are encrypted, by trying to create a conventional pointer to an object in memory, the adversary causes DECD-CAP to be run on the created conventional pointer, which cannot be decrypted, or if it can somehow, that cannot point to the actual memory location desired by the adversary.

Example 10 is next described. With reference thereto, in example 10 it is assumed that a remote adversary somehow obtains the original contents of pointer P.0 970. For example, this may be the result of a bug in function B.0 811 (FIG. 8) that erroneously sends the contents of P.0 970 to the network. The adversary attempts to undetectably corrupt P.0 970 using its knowledge of the original contents of P.0 in such a way that the corruption goes undetected. For illustrative purposes, it is assumed that the original contents of P.0 970 point to Shared Object 0 821 of FIG. 8, hence the Pointer field of capability 970 has an address of 0x1000. It is further assumed that the adversary overwrites P.0 with the corrupted pointer value 975 in an attempt to redirect subsequent accesses away from Shared Object 0 to Shared Object 1 823 (FIG. 8). However, because the constrained bits in corrupted pointer 975 differ from those in the original pointer 970, and since the adversary is unable to undetectably modify the ciphertext slice in capability 975, this corrupt capability will ultimately decrypt to a pointer that is likely to point to an unmapped memory address, resulting in an exception when Function B.0 811 attempts to access the address.

Next described are alternate approaches, according to some embodiments, for securing code capabilities without requiring encryption. In this context it is noted that rather than requiring encrypted code capabilities as described above, in alternate embodiments checks may be performed at the destination of each branch to verify that the branch operation is authorized. These alternate approaches may, in embodiments, be implemented on computing devices that utilize Intel® Corporation's Control-flow Enforcement Technology (CET), and that utilize Intel® Corporation's Memory Protection Extensions (MPX). MPX is a mechanism for checking memory bounds, and CET is, among other things, a mechanism for restricting indirect branch targets to enforce control-flow integrity. Intel® MPX introduces new bounds registers, and new instruction set extensions that operate on these registers. Additionally, MPX provides a new set of "bound tables" that store bounds beyond what can fit in bounds registers. In embodiments, two mechanisms may be used to implement this functionality.

Alternatively, these approaches may also be implemented on other computing devices, with equivalent or similar mechanisms for checking or verifying memory bounds, and mechanisms for restricting indirect branch targets to those that are allowed.

In a first alternate approach, in embodiments, CET (or equivalent) may be enabled so that all indirect branches must land on ENDBRANCH instructions, or their equivalent. It is here noted that ENDBRANCH (or specifically ENDBR64, in 64-bit mode) is an Intel® Corporation instruction that must be present to mark a given location in the code as being a valid target for an indirect branch, i.e. one that branches to an address contained in a register. Otherwise, if the indirect branch lands on some other instruction, a fault will be generated when ENDBRANCH checking is enabled. It is further noted that as used herein, "ENDBRANCH" may refer to both 64-bit and 32-bit versions of the instruction, which are known specifically as "ENDBR64" AND "ENDBR32", respectively.

Figure 10:
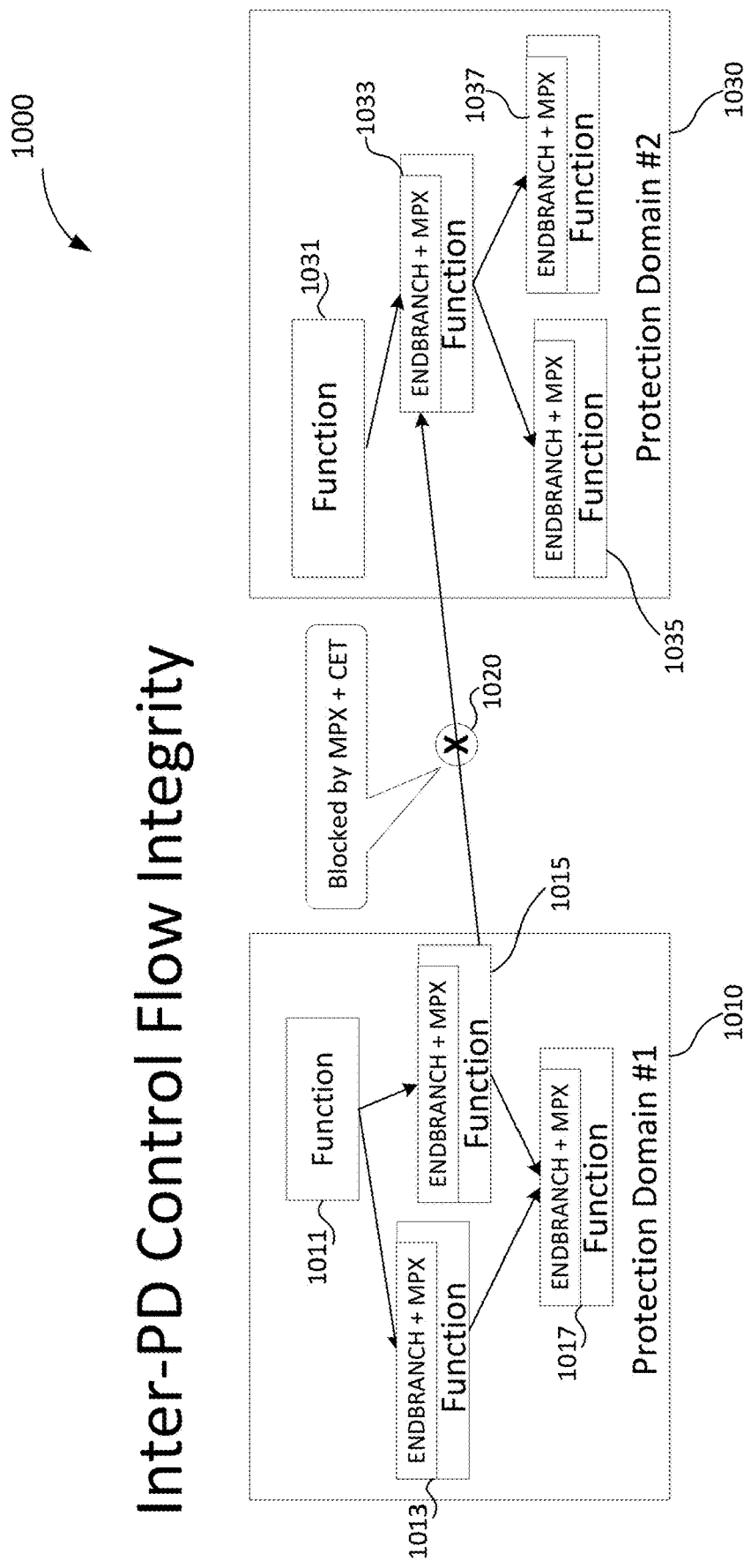
FIG. 10 illustrates maintaining integrity between protection domains by adding bounds checks after each END-BRANCH (indirect branch valid location marking) instruction, in accordance with various embodiments.

In embodiments, a bounds check may be performed after each ENDBRANCH instruction to verify that the current instruction pointer (i.e., the code location) is within the bounds of the code region for the current PD. In embodiments, a special ENDBRANCH instruction may also be provided that lacks an associated MPX bounds check in the root PD, since any PD is authorized to invoke the root PD at that entry point. In such embodiments, that would be the entry point for invoking root PD functionality, such as sending messages to other PDs and yielding control to a scheduler. FIG. 10, next described, illustrates such an exemplary use of CET and MPX (or equivalents) to control indirect branches in such embodiments. It is noted that while FIG. 10 refers to CET and MPX, in alternate embodiments, the illustrated functionality may be implemented using equivalents of CET and MPX.

With reference to FIG. 10, there are shown two protection domains, Protection Domain #1 1010 and Protection Domain #2 1020. Protection Domain #1 1010 has four functions running in it, namely Functions 1011, 1013, 1015 and 1017. Function 1011 has two indirect branches, one into each of Functions 1013 and 1015. Similarly, Functions 1013 and 1015 each have an indirect branch to Function 1017. In addition, Function 1015 also indirectly branches to Function 1033 of Protection Domain #2 1030.

Similarly, Protection Domain #2 1030 has four functions of its own, Functions 1031, 1033, 1035 and 1037. Function 1031 has an indirect branch to Function 1033, and Function 1033 has an indirect branch to each Functions 1035 and 1037. As described above, each indirect branch in each protection domain lands on an ENDBRANCH instruction, and, as also described above, in embodiments, an MPX bounds check may be performed following the execution of the ENDBRANCH instruction.

As shown, the indirect branch from Function 1015 of Protection Domain #1 1010 to Function 1033 of Protection Domain #2 1030, is blocked, at 1020, by MPX and CET. Thus, in embodiments that utilize MPX and CET, coarsegrained MPX bounds checks may be added after each ENDBRANCH instruction to ensure that a new RIP is within the bounds of the code segment for the currently-active protection domain. In these alternate embodiments, it would not be necessary to encrypt code capabilities, and thus the process illustrated in FIG. 1B, blocks 150 and 160 would be limited to insertion of encryption instructions for generated pointers to data. Thus, in such embodiments the encryption instruction (e.g., ENCCAP) would simply not be invoked for generating code capabilities. It would only be invoked for generating data capabilities.

In embodiments, another alternate approach may be to extend the ENDBRANCH instruction (or equivalent) to accept an immediate operand, specifying the PDID of the PD in which that ENDBRANCH instruction may successfully execute. It is here noted that immediate operands by definition are numeric values embedded into code, and thus, they would be embedded when the PD is compiled or at some later point, such as when the PD is loaded. Thus, if an indirect branch lands on an ENDBRANCH instruction specifying a different PDID than the current PDID, which may, for example, be contained in an internal CPU register, then a fault may be generated. In such embodiments, a PDID value of 0 may be used to specify that any indirect branch is allowed to land on that ENDBRANCH instruction (e.g., for use at the authorized entrypoint into the root PD). Similarly, in such embodiments, an ENDBRANCH instruction that does not contain any immediate operand may be targeted by any indirect branch.

As noted above, in some embodiments, an instruction may be defined to narrow the bounds of a capability. Such an instruction, for example, may be called "NARROWCAP", and may have the following interface:

NARROWCAP r64, r64, and may operate as follows. The instruction may read an input capability from a first register and the desired narrowed size from a second register. The instruction may then decrypt the input capability, replace its object size field with the contents of the second register, and then re-encrypt the input capability with the new object size, where the object size must be smaller than the object size specified in original input capability, e.g., in Object Size field 310 as shown in FIG. 3. In embodiments, if, following execution of NARROWCAP the new object size is not smaller than the original, a fault may be generated.

Additionally, in embodiments, NARROWCAP may support changing the base address of the capability, and may check that the final bounds of the new capability do not exceed the bounds of the input capability in either direction. In embodiments, this extended functionality may be based on an additional operand to specify the new object base. The checks described above to be performed by NARROWCAP are to prevent the instruction from being misused to grant access to more memory than was authorized by the input capability.

It is also noted that in embodiments that embed permissions metadata into capabilities, such as, for example, by including bits that indicate whether the memory is readable, writable, executable, etc., in such embodiments a NARROWCAP instruction may also support restricting that metadata as well, in addition to just restricting the range of the accessible memory, as described above. Thus, to support these embodiments, NARROWCAP may be extended to accept a third r64 operand specifying the new permissions, and its execution may further include a check to only accept the permission specification if it is more restrictive than the existing permissions in the original capability input to the NARROWCAP instruction.

It is noted that, in embodiments, a NARROWCAP instruction may be instrumented by a compiler, and executed at runtime.

Finally, in the context of an encryption instruction, e.g., ENCCAP, as described above, it is noted that for uses of ENCCAP within a non-root PD, the memory referred to must be within the private region owned by that PD. In embodiments, this may be verified in a number of ways. In embodiments, the compiler and runtime loader may be able to statically verify by examining the code that the object is within those bounds. Alternatively, an MPX type or arithmetic bounds check may be required by the runtime prior to execution of an ENCCAP instruction.

Next described are three examples relating to embodiments utilizing the ENDBRANCH instruction described above. The examples relate to the example memory layout of FIG. 8. In a first example, as an alternative to using ENCCAP and DECCCAP to restrict control flow, an ENDBRANCH instruction and MPX may be used instead. Thus, assuming a branch in Function A.0 801 of FIG. 8 that targets the label "dest.", an ordinary, unencrypted pointer may be used to direct the branch. As noted above, an ENDBRANCH instruction is the first instruction at the label "dest", so execution is allowed to proceed to the next instruction. Further, two MPX bounds checking instructions may be used to check the current instruction pointer (i.e. code location) against the lower and upper code bounds for the current PD, Protection Domain A 805. If either check fails, an exception is generated. Otherwise, execution proceeds.

In a second example, it is assumed that Function B.1 813 of Protection Domain B 810 may be malicious and may attempt to branch to "dest." in Function A.0 801. That would be an unauthorized branch, since Function B.1 and Function A.0 are in different protection domains. An MPX lower-bound check instruction that follows the dest label would therefore generate an exception, since the address of "dest." (0x0027) is below the lower bound of PD B's code (0x0100).

In a third example, as an alternative to using MPX bounds checks, in embodiments, the ENDBRANCH instruction itself may be extended with an immediate operand that may be checked for equality with the contents of an internal CPU register representing an authorized ENDBRANCH ID for the current PD. If the second example above were replayed in this context, the ENDBRANCH ID check at "dest." would fail.

In a fourth example, as an alternative to using MPX bounds checks, in embodiments, the ENDBRANCH instruction could be followed by a comparison instruction that has an immediate operand specifying the PDID to be compared against a thread-local memory location for the currently-active PDID. If the two PDIDs do not match, a subsequent branch would transfer control to a handler.

In a fifth example, as an alternative to using MPX bounds checks on the current instruction pointer, in embodiments, the ENDBRANCH instruction could be followed by an instruction to read the current shadow stack pointer and MPX bounds checks or equivalent arithmetic instructions to verify that the current shadow stack pointer is within the bounds of the shadow stack for the current PD. Alternatively, the current stack pointer could be verified to be within the bounds of the stack for the current PD.

Finally, in a sixth example, as an alternative to using MPX bounds checks on the current instruction pointer, in embodiments, the ENDBRANCH instruction could be followed by an instruction to load the PDID for the code region within which it resides and MPX bounds checks to verify that the loaded PDID matches the current PDID. The current PDID would be stored in an MPX bounds register as both the lower and upper bound so that a pair of BNDCN and BNDCL instructions, or their equivalents, could be used to check the loaded PDID. A BNDCL instruction checks a lower bound using a bounds register lower value, and a BNDCN instruction checks an upper bound using a bounds register upper value.

Figure 11:
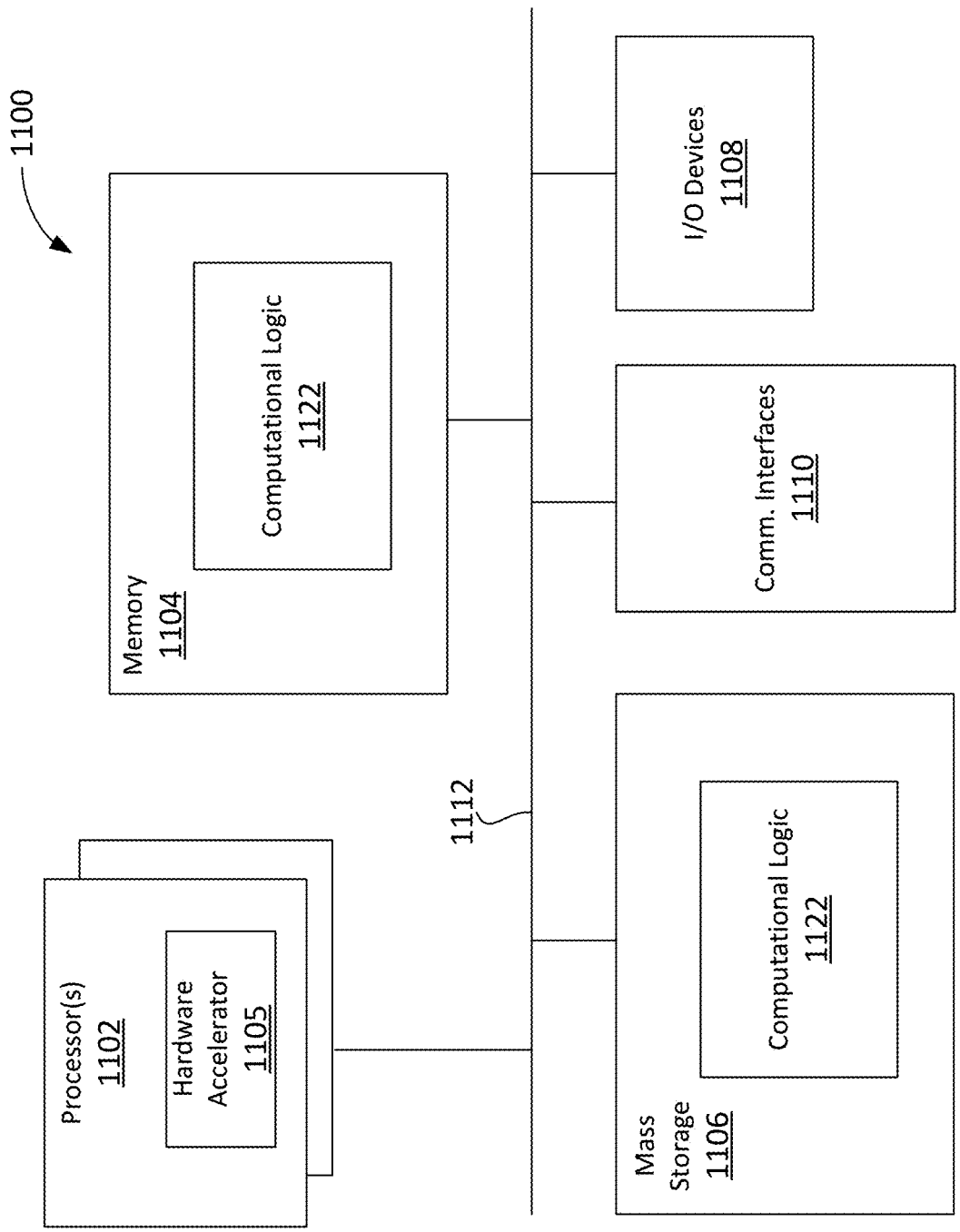
FIG. 11 illustrates a block diagram of a computer device having a dataflow machine (hardware accelerator) suitable for practicing the present disclosure, in accordance with various embodiments.

Referring now to FIG. 11, wherein a block diagram of a computer device suitable for practicing the present disclosure, in accordance with various embodiments, is illustrated. As shown, computer device 1100 may include one or more processors 1102, memory controller 1103, and system memory 1104. Each processor 1102 may include one or more processor cores, and hardware accelerator 1105. An example of hardware accelerator 1105 may include, but is not limited to, programmed field programmable gate arrays (FPGA). In embodiments, processor 1102 may also include a memory controller (not shown). In embodiments, processor(s) may be configured to support and ISA that support instructions ENCCAP, DECDCAP, DECCCAP, NARROW- CAP, INCEPOCH, ENDBRANCH, or their equivalents. System memory 1104 may include any known volatile or non-volatile memory.

Additionally, computer device 1100 may include mass storage device(s) 1106 (such as solid state drives), input/output device interface 1108 (to interface with various input/output devices, such as, mouse, cursor control, display device (including touch sensitive screen), and so forth) and communication interfaces 1110 (such as network interface cards, modems and so forth). In embodiments, communication interfaces 1110 may support wired or wireless communication, including near field communication. The elements may be coupled to each other via system bus 1112, which may represent one or more buses. In the case of multiple buses, they may be bridged by one or more bus bridges (not shown).

Each of these elements may perform its conventional functions known in the art. In particular, system memory 1104 and mass storage device(s) 1106 may be employed to store a working copy and a permanent copy of the executable code of the programming instructions of an operating system, one or more applications, and various modules, collectively referred to as computing logic 1122, which may include a compiler, which may be configured to have the architecture 100A and practice (aspects of) process 100B as described in FIGS. 1A and 1B, and having a runtime environment configured to practice the process 600 of FIG. 6. In embodiments, as described earlier, the executable code generated for a computer program by the compiler may include encryption instructions and decryption instructions as earlier described with references to FIGS. 1A and 1B. During execution of the generated instructions, the runtime environment may provide a mechanism for one part of the computer program to transmit an authorization to another part of the computer program to access a certain piece of memory. The programming instructions implementing computing logic 1122 may comprise assembler instructions supported by processor(s) 1102 or high-level languages, such as, for example, C, that can be compiled into such instructions. In embodiments, some of computing logic may be implemented in hardware accelerator 1105. In embodiments, part of computational logic 1122, e.g., a portion of the computational logic 1122 associated with the runtime environment of the compiler, may be implemented in hardware accelerator 1105.

The permanent copy of the executable code of the programming instructions or the bit streams for configuring hardware accelerator 1105 may be placed into permanent mass storage device(s) 1106 and/or hardware accelerator 1105 in the factory, or in the field, through, for example, a distribution medium (not shown), such as a compact disc (CD), or through communication interface 1110 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 1110-1112 may vary, depending on the intended use of example computer device 1100, e.g., whether example computer device 1100 is a smartphone, tablet, ultrabook, a laptop, a server, a set-top box, a game console, a camera, and so forth. The constitutions of these elements 1110-1112 are otherwise known, and accordingly will not be further described.

Figure 12:
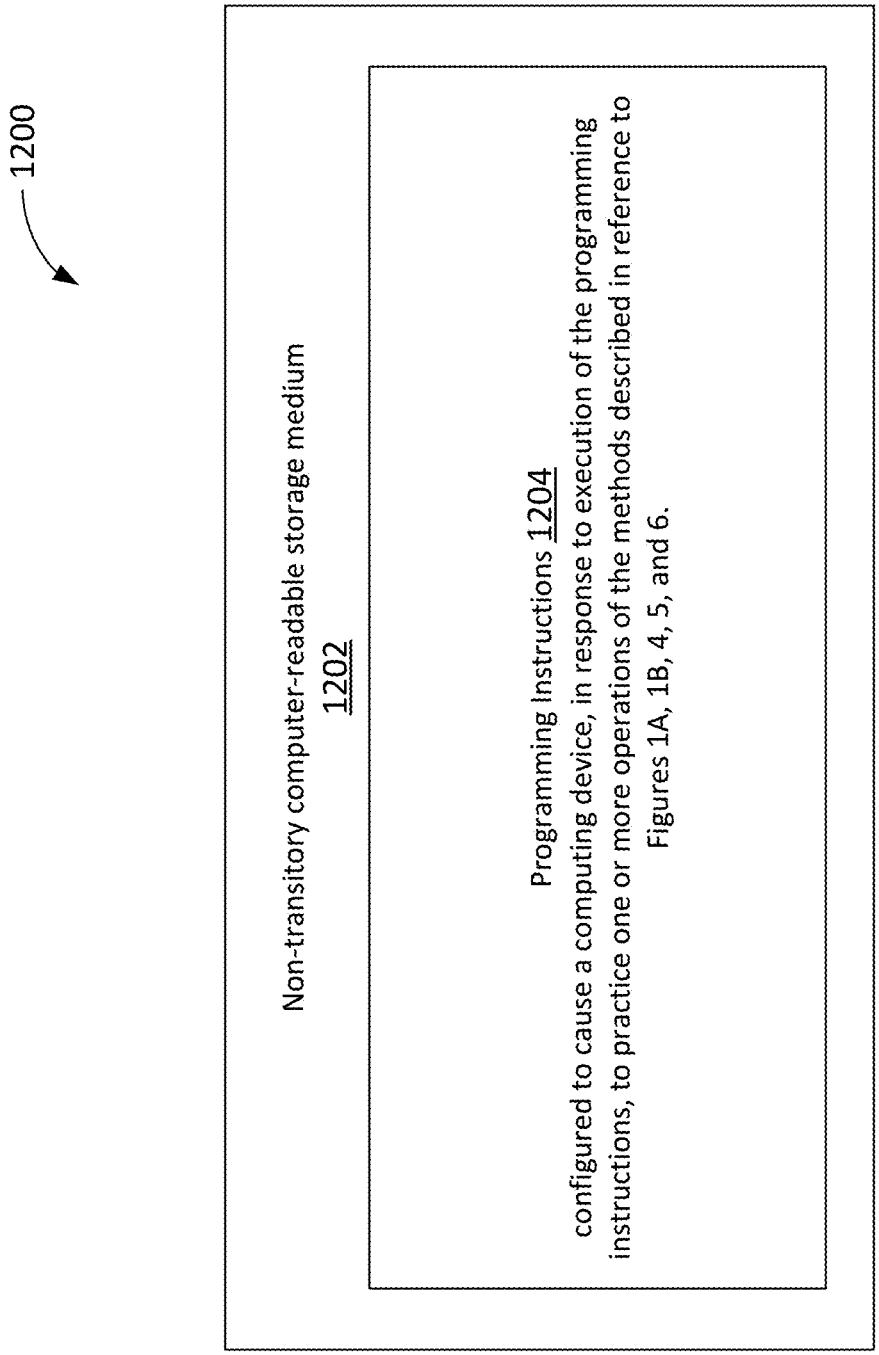
FIG. 12 illustrates an example computer-readable storage medium having instructions configured to practice aspects of the processes of FIGS. 1A, 1B, 4, 5 and 6, in accordance with various embodiments.

FIG. 12 illustrates an example computer-readable storage medium having instructions configured to implement and/or practice (aspects of) processes 100A, 100B, 400, 500 and 600 of FIGS. 1A, 1B, 4, 5, and 6, respectively, earlier described, in accordance with various embodiments. As illustrated, computer-readable storage medium 1202 may include the executable code of a number of programming instructions or bit streams 1204. Executable code of programming instructions (or bit streams) 1204 may be configured to enable a device, e.g., computer device 1100 (in particular, hardware accelerator 1105), in response to execution of the executable code/programming instructions (or operation of an encoded hardware accelerator 1205), to perform (aspects of) processes 100A, 100B, 400, 500 and 600 of FIGS. 1A, 1B, 4, 5, and 6, respectively. In alternate embodiments, executable code/programming instructions/bit streams 1204 may be disposed on multiple non-transitory computer-readable storage medium 1202 instead. In embodiments, computer-readable storage medium 1202 may be non-transitory. In still other embodiments, executable code/programming instructions 1204 may be encoded in transitory computer readable medium, such as signals.

Referring back to FIG. 11, for one embodiment, at least one of processors 1102 may be packaged together with a computer-readable storage medium having some or all of the compiler or runtime environment of computing logic 1122 (in lieu of storing in system memory 1104 and/or mass storage device 1106) configured to practice all or selected ones of the operations earlier described with reference to FIGS. 3, 4, 5A, 5B and 6. For one embodiment, at least one of processors 1102 may be packaged together with a computer-readable storage medium having some or all of the compiler or runtime environment of computing logic 1122 to form a System in Package (SiP). For one embodiment, at least one of processors 1102 may be integrated on the same die with a computer-readable storage medium having some or all of the compiler or runtime environment of computing logic 1122. For one embodiment, at least one of processors 1102 may be packaged together with a computer-readable storage medium having some or all of the compiler or runtime environment of computing logic 1122 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

EXAMPLES

Example 1 may include an apparatus for computing, comprising one or more processors, a memory, and a compiler to be operated by the one or more processors to compile a computer program, wherein the compiler includes one or more analyzers to parse and analyze source code of a computer program that generate pointers or de-reference pointers. The compiler may further include a code generator coupled to the one or more analyzers to generate executable instructions for the source code of the computer program including insertion of additional encryption or decryption executable instructions into the computer program, based at least in part on a result of the analysis, to authenticate memory access operations of the source code.

Example 2 may include the apparatus of example 1, and/or other examples herein, wherein: the additional executable instructions comprise: an encryption instruction to be inserted following any source code of the computer program that generates a pointer; and a decryption instruction to be inserted preceding any source code of the computer program that de-references a pointer.

Example 3 may include the apparatus of example 2, and/or other examples herein, wherein the encryption instruction and the decryption instruction each take as an input a protection domain identifier (PDID) representing a protection domain (PD) to be loaded into a runtime environment of one or more processors for execution of the generated instructions.

Example 4 may include the apparatus of either of examples 2 or 3, and/or other examples herein, wherein a separate PD is assigned to each of one or more applications to be loaded into the runtime environment, the one or more applications having access to a shared region of memory.

Example 5 may include the apparatus of example 2, and/or other examples herein, wherein, when executed, an output of the encryption instruction comprises a pointer that is at least partially encrypted and includes embedded metadata that grants access to a memory location, and wherein when the at least partially encrypted pointer is input into a decryption instruction and the decryption instruction is successfully executed, the corresponding pointer to be generated by the source code of the computer program is obtained.

Example 6 may include the apparatus of example 5, and/or other examples herein, wherein execution of the decryption instruction further requires a key, the key assigned to a PD in which an application executing the decryption instruction runs by a root PD of a runtime environment of the one or more processors for execution of the generated instructions.

Example 7 may include the apparatus of example 6, and/or other examples herein, wherein the key is a selected one of a first key used to encrypt a pointer that is persistent across multiple pre-defined time intervals or a second key used to encrypt a pointer that is only valid for a single pre-defined time interval.

Example 8 may include the apparatus of example 7, and/or other examples herein, wherein the key is the second key, and wherein access to the memory location indicated by the encrypted pointer is revoked at the expiration of the single pre-defined time interval by changing the key needed to execute a decryption instruction on the at least partially encrypted pointer.

Example 9 may include the apparatus of any one of examples 5-7, and/or other examples herein, wherein the at least partially encrypted pointer has a size equal to a size of the corresponding pointer to be generated by the source code of the computer program.

Example 10 may include the apparatus of example 5, and/or other examples herein, wherein the at least partially encrypted pointer comprises three fields: a permanent field, an object size field, and a pointer field, and wherein: the permanent field is used to indicate whether the encrypted pointer will not expire or will only be valid for a single pre-defined time interval, the object size field specifies a size of an object in the memory that the encrypted pointer grants access to, and the pointer field specifies an address in the memory for the object.

Example 11 may include the apparatus of example 10, and/or other examples herein, wherein the encryption instruction provides that only a portion of the pointer field is to be encrypted, the portion comprising a number of most significant bits of the pointer field.

Example 12 may include the apparatus of example 11, and/or other examples herein, wherein the object size field and a number of the unencrypted bits in the pointer field are incorporated into a tweak to be used in decrypting the at least partially encrypted pointer.

Example 13 may include the apparatus of any one of examples 5-7, and/or other examples herein, further comprising a fixed block size cipher to at least partially encrypt the at least partially encrypted pointer.

Example 14 may include the apparatus of any one of examples 5-7, and/or other examples herein, wherein the decryption instruction takes as inputs the at least partially encrypted pointer, a PDID of the PD that generates the pointer, and a tweak, the tweak comprising: the PDID, the object size field, and a pre-defined number of least significant bits of the pointer field of the at least partially encrypted pointer that were not encrypted.

Example 154 may include the apparatus of example 2, and/or other examples herein, further comprising an associated runtime manager of the compiler to check, prior to execution, each executable instruction of the compiled computer program that generates pointers or de-references pointers, to confirm that the associated encryption instructions, or associated decryption instructions, were inserted by the compiler, and to prevent execution of the compiled source code in response to a failure to confirm.

Example 16 may include the apparatus of example 1, and/or other examples herein, wherein the additional decryption instructions include a decryption instruction for a pointer used for a data access, or a decryption instruction for a pointer used in a branch instruction.

Example 17 may include one or more non-transitory computer-readable storage media comprising a plurality of instructions that, in response to being executed, cause a computing device to provide a compiler to compile a computer program, to: parse and analyze source code of a computer program that generates pointers or de-references pointers; and generate executable instructions for the source code of the computer program including insertion of additional encryption or decryption executable instructions into the computer program, based at least in part on a result of the analysis, to restrict memory access operations of the processor to authorized processes.

Example 18 may include the one or more non-transitory computer-readable storage media of example 17, and/or other examples herein, wherein: the additional executable instructions comprise: an encryption instruction to be inserted following any source code of the computer program that generates a pointer; and a decryption instruction to be inserted preceding any source code of the computer program that de-references a pointer.

Example 19 may include the one or more non-transitory computer-readable storage media of example 17, and/or other examples herein, wherein the encryption instruction and the decryption instruction each take as an input a protection domain identifier (PDID) representing a protection domain (PD) to be loaded into a runtime environment of the computing device for execution of the generated instructions.

Example 20 may include the one or more non-transitory computer-readable storage media of either of claim 17 or 18, and/or other examples herein, wherein, when executed, an output of the encryption instruction comprises a pointer that is at least partially encrypted and includes embedded metadata that grants access to a memory location.

Example 21 may include the one or more non-transitory computer-readable storage media of example 20, and/or other examples herein, wherein when the at least partially encrypted pointer is input into a decryption instruction and the decryption instruction is successfully executed, the corresponding pointer to be generated by the source code of the computer program is obtained.

Example 22 may include the one or more non-transitory computer-readable storage media of example 21, and/or other examples herein, wherein execution of the decryption instruction further requires a key, the key to be assigned to a PD in which an application executing the decryption instruction runs by a root PD of a runtime environment of one or more processors for execution of the generated instructions.

Example 23 may include the one or more non-transitory computer-readable storage media of example 22, and/or other examples herein, wherein the key is a selected one of a first key used to encrypt a pointer that is persistent across multiple pre-defined time intervals or a second key used to encrypt a pointer that is only valid for a single pre-defined time interval.

Example 24 may include the one or more non-transitory computer-readable storage media of example 23, and/or other examples herein, wherein the key is the second key, and wherein access to the memory location indicated by the encrypted pointer is revoked at the expiration of the single pre-defined time interval by changing the key needed to execute a decryption instruction on the at least partially encrypted pointer.

Example 25 may include the one or more non-transitory computer-readable storage media of example 20, and/or other examples herein, wherein the at least partially encrypted pointer comprises three fields: a permanent field, an object size field, and a pointer field, and wherein: the permanent field is used to indicate whether the encrypted pointer will not expire or will only be valid for a single pre-defined time interval, the object size field specifies a size of an object in a memory of the computing device that the encrypted pointer grants access to, and the pointer field specifies an address in the memory of the computing device for the object.

Example 26 may include the one or more non-transitory computer-readable storage media of example 25, and/or other examples herein, wherein the encryption instruction provides that only a portion of the pointer field is to be encrypted, the portion comprising a number of most significant bits of the pointer field.

Example 27 may include the one or more non-transitory computer-readable storage media of example 26, and/or other examples herein, wherein the object size field and a number of the unencrypted bits in the pointer field are incorporated into a tweak to be used in decrypting the at least partially encrypted pointer.

Example 28 may include the one or more non-transitory computer-readable storage media of example 20, and/or other examples herein, wherein execution of the encryption instruction further requires a fixed block size cipher to at least partially encrypt the at least partially encrypted pointer.

Example 29 may include the one or more non-transitory computer-readable storage media of example 20, and/or other examples herein, wherein the decryption instruction takes as inputs the at least partially encrypted pointer, a PDID of the PD that generates the pointer, and a tweak.

Example 30 may include the one or more non-transitory computer-readable storage media of example 29, and/or other examples herein, wherein the tweak comprises: the PDID, the object size field, and a pre-defined number of least significant bits of the pointer field of the at least partially encrypted pointer that were not encrypted.

Example 31 may include the one or more non-transitory computer-readable storage media of example 17, and/or other examples herein, further causing, upon execution of the plurality of instructions, the computing device to provide an associated runtime manager of the compiler to check, prior to execution, each executable instruction of the compiled computer program that generates pointers or de-references pointers, to confirm that the associated encryption instructions, or associated decryption instructions, were inserted by the compiler, and to prevent execution of the compiled source code in response to a failure to confirm.

Example 32 may include a method of authenticating access to a memory region shared by one or more applications running on a computing device, comprising: receiving a first request from a function running in a protection domain (PD) of a runtime environment to allocate an object in a shared memory and to generate a capability to access it; assigning a key to the PD and generating an encrypted pointer to the memory location of the object using an identifier of the PD (PDID) and the key; receiving a second request from a function running in the PD to use the capability; and decrypting the capability and passing an unencrypted pointer to the object to the function.

Example 33 may include the method of example 32, and/or other examples herein, wherein the encrypted pointer includes metadata indicating the size of the object and whether the encrypted pointer persists through several pre-defined time intervals of the runtime environment, or whether it expires after one pre-defined time interval of the runtime environment.

Example 34 may include the method of example 32, and/or other examples herein, wherein the key to the PD is assigned by a root PD of the runtime environment.

Example 35 may include the method of example 32, and/or other examples herein, wherein assigning a key to the PD includes assigning the key to an epoch that is active while the PD is running.

Example 36 may include the method of example 32, and/or other examples herein, wherein the key expires after one pre-defined time interval of the runtime environment, and further comprising causing the key to expire by changing the key assigned to the PD.

Example 37 may include the method of example 32, and/or other examples herein, further comprising determining if the second request includes transferring the capability to access the object to a function in another PD of the runtime environment.

Example 38 may include the method of example 37, and/or other examples herein, further comprising in response to the determination, decrypting the encrypted pointer using the current key of the PD, generating and assigning a new key for the other PD, and re-encrypting the decrypted pointer using the PDID of the other PD and the new key assigned to the other PD.

Example 39 may include the method of example 37, and/or other examples herein, further comprising determining whether the other PD is not running, or is not ready for an incoming capability, and in response to the determination, enqueueing the decrypted pointer with information specifying the identity of the other PD.

Example 40 may include the method of example 39, and/or other examples herein, further comprising, upon receiving an indication that the other PD is ready to accept an incoming capability, encrypting the decrypted capability using the key for the other PD and transferring the capability to the other PD.

Example 41 may include the method of example 32, and/or other examples herein, wherein the second request includes a request to narrow the size of the object to be accessed with the capability.

Example 42 may include the method of example 41, and/or other examples herein, further comprising decrypting the capability, replacing an object size field of the capability with narrowed size, and re-encrypting the capability.

Example 43 may include one or more non-transitory computer-readable storage media comprising a plurality of instructions that, in response to being executed, cause a computing device to perform the method of any one of examples 32-42.

Example 44 may include an apparatus for computing, comprising: means for receiving a first request from a function running in a protection domain (PD) of a runtime environment to allocate an object in a shared memory and to generate a capability to access it; means for assigning a key to the PD and generating an encrypted pointer to the memory location of the object using an identifier of the PD (PDID) and the key; means for receiving a second request from a function running in the PD to use the capability; and means for decrypting the capability and passing an unencrypted pointer to the object to the function.

Example 45 may include the apparatus for computing of example 44, and/or other examples herein, wherein the encrypted pointer includes metadata indicating the size of the object and whether the encrypted pointer persists through several pre-defined time intervals of the runtime environment, or whether it expires after one pre-defined time interval of the runtime environment.

Example 46 may include the apparatus for computing of example 44, and/or other examples herein, wherein the means for assigning includes a root PD of the runtime environment.

Example 47 may include the apparatus for computing of example 44, and/or other examples herein, wherein the means for assigning includes means for assigning the key to an epoch that is active while the PD is running.

Example 48 may include the apparatus for computing method of example 44, and/or other examples herein, wherein the key expires after one pre-defined time interval of the runtime environment, and further comprising means for causing the key to expire including means for changing the key assigned to the PD.

Example 49 may include the apparatus for computing of example 44, and/or other examples herein, further comprising means for determining if the second request includes transferring the capability to access the object to a function in another PD of the runtime environment.

Example 50 may include the apparatus for computing of example 49, and/or other examples herein, wherein the means for decrypting is to further decrypt the encrypted pointer using the current key of the PD, the means for assigning is further to generate and assign a new key for the other PD, and the means for encrypting is to further re-encrypt the decrypted pointer using the PDID of the other PD and the new key assigned to the other PD.

Example 51 may include the apparatus for computing of example 49, and/or other examples herein, further comprising means for determining whether the other PD is not running, or is not ready for an incoming capability, and means for enqueueing the decrypted pointer with information specifying the identity of the other PD.

Example 52 may include the apparatus for computing of example 49, and/or other examples herein, further comprising means for receiving an indication that the other PD is ready to accept an incoming capability, means for encrypting the decrypted capability using the key for the other PD and means for transferring the capability to the other PD.

Example 53 may include the apparatus for computing of example 44, and/or other examples herein, wherein the means for receiving the second request is further to receive a request to narrow the size of the object to be accessed with the capability.

Example 54 may include the apparatus for computing of example 53, and/or other examples herein, wherein the means for decrypting is further to decrypt the capability, and further comprising means for replacing an object size field of the capability with a narrowed size, and means for re-encrypting the capability.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus for computing, comprising:
a first hardware processor;
and
a compiler to be operated by the first hardware processor to compile a computer program, wherein the compiler includes:
one or more analyzers to parse and analyze source code of the computer program that generate pointers or de-reference pointers; and
a code generator coupled to the one or more analyzers to generate executable instructions for the source code of the computer program including as part of the generation, insertion of additional encryption or decryption executable instructions into the executable instructions of the source code of the computer program being generated, based at least in part on a result of the analysis, wherein the additional encryption or decryption executable instructions being inserted are arranged to authenticate memory access operations of the source code;
wherein when the generated executable instructions of the source code of the computer program and the additional encryption or decryption executable instructions are executed by a second hardware processor of another apparatus provided with the generated executable instructions of the source code of the computer program and the additional encryption or decryption executable instructions, an output of each executed one of the additional encryption instruction comprises a pointer that is at least partially encrypted and includes embedded metadata that grants access to one of a plurality of memory locations of a memory coupled to the second hardware processor, and the at least partially encrypted pointer is inputted into one of the decryption instructions, which on execution, recovers the pointer.

2. The apparatus of claim 1, wherein:
the additional executable instructions comprise:
an encryption instruction inserted following each of the source code of the computer program that generates a pointer; and
a decryption instruction inserted preceding each of the source code of the computer program that de-references a pointer.

3. The apparatus of claim 2, wherein each of the inserted encryption instructions and each of the inserted decryption instructions takes as an input a protection domain identifier (PDID) that identifies a protection domain (PD) to be loaded into a runtime environment of the second hardware processor.

4. The apparatus of claim 3, wherein the PD is assigned to the generated instructions of the source code of the computer program, and the additional encryption and decryption instructions, and wherein during execution, the generated instructions of the source code of the computer program and the additional encryption and decryption instructions have access to a region of the memory coupled to the second hardware processor, where the region is shared with other computer programs being concurrently executed by the second hardware processor.

5. The apparatus of claim 4, wherein execution of each of the inserted decryption instructions further requires a key, wherein the key is assigned to the PD.

6. The apparatus of claim 5, wherein the key is either a first key that is persistent across multiple pre-defined time intervals or a second key that is only valid for a single pre-defined time interval.

7. The apparatus of claim 6, wherein the key is the second key, and wherein access to one of the plurality of memory locations indicated by one of the encrypted pointers is revoked at the expiration of the single pre-defined time interval by changing the key required by a decryption instruction.

8. The apparatus of claim 1, wherein each of the partially encrypted pointers comprises three fields: a permanent field, an object size field, and a pointer field, and wherein:
the permanent field is used to indicate whether the particular partially encrypted pointer will not expire or will only be valid for a single pre-defined time interval,
the object size field specifies a size of one of a plurality of objects in the memory that the particular encrypted pointer grants access to, and
the pointer field specifies an address in the memory for the one object.

9. The apparatus of claim 8, wherein a number of most significant bits of the pointer field of each of the partially encrypted pointers is encrypted.

10. The apparatus of claim 9, wherein the object size field and a number of unencrypted bits in the pointer field of each of the partially encrypted pointers are incorporated into a tweak to be used in affecting decryption of the at least partially encrypted pointer of the particular partially encrypted pointer.

11. The apparatus of claim 1, wherein each of the inserted decryption instructions takes as inputs at least a partially encrypted pointer, and a tweak, wherein the tweak comprises: a pre-defined number of least significant bits of the at least partially encrypted pointer that were not encrypted.

12. The apparatus of claim 1, wherein the first or second hardware processor further comprises an associated runtime manager of the compiler to check each executable instruction of the generated executable instruction of the source code of the computer program, prior to their respective executions, to confirm presence of the additional encryption and decryption instructions, and to prevent execution of the generated executable instruction of the source code of the computer program in response to a failure to confirm.

13. The apparatus of claim 1, wherein the first hardware processor further comprises a fixed block size cipher to generate the at least partially encrypted pointers outputted by the additional encryption instructions, when executed.

14. One or more non-transitory computer-readable storage media comprising a plurality of instructions that, in response to being executed by a first hardware processor of a first computing device, cause the first computing device to provide a compiler to compile a computer program, that includes:
to parse and analyze source code of the computer program that generates pointers or de-references pointers; and
to generate executable instructions for the source code of the computer program including as part of the generation, insertion of additional encryption or decryption executable instructions into the executable instructions for the source code of the computer program being generated, based at least in part on a result of the analysis, wherein the additional encryption or decryption executable instructions being inserted are arranged to restrict memory access operations against a plurality of memory locations of a memory of a second hardware processor of a second computing device used to execute the generated instructions of the source code of the computer program and the additional encryption and decryption instructions, the second computing device having been provided with the generated executable instructions of the source code of the computer program and the additional encryption or decryption executable instructions;
wherein when the generated executable instructions of the source code of the computer program and the additional encryption or decryption executable instructions are executed by the second hardware processor, an output of each executed encryption instruction comprises a pointer that is at least partially encrypted, and the at least partially encrypted pointer is inputted into one of the decryption instructions, which on execution, recovers the pointer; and
wherein each of the partially encrypted pointers comprises three fields: a permanent field, an object size field, and a pointer field, the permanent field being used to indicate whether the particular partially encrypted pointer will not expire or will only be valid for a single pre-defined time interval, the object size field specifying a size of one of a plurality of objects in the memory that the encrypted pointer grants access to, and the pointer field specifying an address in the memory for the one object.

15. The one or more non-transitory computer-readable storage media of claim 14, wherein:
the inserted additional executable instructions comprise:
an encryption instruction inserted following each of the source code of the computer program that generates a pointer; and
a decryption instruction inserted preceding each of the source code of the computer program that de-references a pointer.

16. The one or more non-transitory computer-readable storage media of claim 15, wherein each of the inserted encryption instructions and each of the inserted decryption instructions take as an input a protection domain identifier (PDID) that identifies a protection domain (PD) to be loaded into a runtime environment of the second hardware processor.

17. The one or more non-transitory computer-readable storage media of claim 15, wherein, when executed, an output of each of the inserted encryption instructions comprises a pointer that is at least partially encrypted and includes embedded metadata that grants access to one of the plurality of memory location in the memory, and wherein the at least partially encrypted pointer outputted by each of the inserted encryption instructions is inputted into one of the inserted decryption instructions and the one decryption instruction is executed to recover the pointer.

18. The one or more non-transitory computer-readable storage media of claim 17, wherein each of the at least partially encrypted pointers comprises three fields: a permanent field, an object size field, and a pointer field, and wherein:

the permanent field is used to indicate whether the particular encrypted pointer will not expire or will only be valid for a single pre-defined time interval, the object size field specifies a size of one of a plurality of objects in the memory that the particular encrypted pointer grants access to, and the pointer field specifies an address in the memory for the one object.

19. The one or more non-transitory computer-readable storage media of claim 15, wherein the second computing device further includes an associated runtime manager of the compiler to check each executable instruction of the generated executable instruction of the source code of the computer program, prior to their respective execution, to confirm presence of the additional encryption instructions and decryption instructions, and to prevent execution of the generated executable instruction of the source code of the computer program in response to a failure to confirm.

20. A method of authenticating access to a memory region shared by one or more applications running on a computing device, comprising:

receiving a first request from a function running in a protection domain (PD) of a runtime environment to allocate an object in a memory location of a shared memory region, and to generate a token for subsequent use to access the object;

assigning a key to the PD, and generating an encrypted version of a pointer to the memory location of the object as the token, using an identifier of the PD (PDID) and the key;

receiving, subsequently, a second request from a function running in the PD to use the token; and decrypting the token to recover the pointer to the memory location of the object, and passing the pointer to the function.

21. The method of claim 20, wherein the token includes metadata indicating a size of the object and whether the token persists through several pre-defined time intervals of the runtime environment, or whether it expires after one pre-defined time interval of the runtime environment.

22. The method of claim 20, wherein the key to the PD is assigned by a root PD of the runtime environment, and the method further comprises causing the key to expire by changing the key assigned to the PD.

23. The method of claim 20, wherein the function is a first function, and the PD is a first PD, and wherein the method further comprises determining if the second request includes transferring the token for use to access the object to a second function in a second PD of the runtime environment, the second PD identified by a second PDID, and in response to the determination, decrypting the token using the key of the first PD, generating and assigning a new key for the second PD, and re-generating the token by re-encrypting the pointer using the second PDID and the new key assigned to the second PD.

\* \* \* \* \*